(12) United States Patent
Holloway

(10) Patent No.: US 12,741,720 B2
(45) Date of Patent: Sep. 22, 2026

(54) WATERCRAFT FIN

(71) Applicant: Daniel Holloway, Currumbin (AU)

(72) Inventor: Daniel Holloway, Currumbin (AU)

( * ) Notice: Subject to any disclaimer, the term of this patent is extended or adjusted under 35 U.S.C. 154(b) by 480 days.

(21) Appl. No.: 18/281,932

(22) PCT Filed: Mar. 16, 2022

(86) PCT No.: PCT/AU2022/050225
§ 371 (c)(1),
(2) Date: Sep. 13, 2023

(87) PCT Pub. No.: WO2022/192947
PCT Pub. Date: Sep. 22, 2022

(65) Prior Publication Data

US 2024/0308627 A1 Sep. 19, 2024

(30) Foreign Application Priority Data

Mar. 18, 2021 (AU) ................................ 2021900783

(51) Int. Cl.
*B63B 32/62* (2020.01)
*B29L 31/52* (2006.01)
(Continued)

(52) U.S. Cl.
CPC .............. *B63B 32/62* (2020.02); *B32B 17/10* (2013.01); *B63B 32/66* (2020.02); *B29L 2031/5272* (2013.01); *B32B 2262/101* (2013.01)

(58) Field of Classification Search
CPC ......... B63B 32/60; B63B 32/62; B63B 32/66; B63B 32/64; B63B 41/00; B63H 1/26;
(Continued)

(56) References Cited

U.S. PATENT DOCUMENTS 5,480,331 A * 1/1996 Lewis ................ B29D 99/0025 114/127
5,807,152 A * 9/1998 Wojcik .................... B63B 32/66 441/74

(Continued)

FOREIGN PATENT DOCUMENTS

| CN | 210133256 U | 3/2020 |
|---|---|---|
| WO | 9219492 A1 | 11/1992 |
| WO | 2011143695 A1 | 11/2011 |

OTHER PUBLICATIONS

Properties of Fiberglass/MWCNT Buckypaper/Epoxy Laminated Composites. Research paper [online]. www.sciencedirect.com, 2016 [retrieved on Feb. 18, 2026]. Retrieved from the Internet: <URL: https://www.sciencedirect.com/science/article/pii/S1876619616001844>. (Year: 2016).*

(Continued)

*Primary Examiner* — Lars A Olson
*Assistant Examiner* — Eric Anthony Starck
(74) *Attorney, Agent, or Firm* — Benjamin D. Rotman; UB Greensfelder LLP

(57) ABSTRACT

The present invention relates to a fin for a watercraft with a flexible spine. The fin has a substantially planar member having a first side surface, a leading edge, a second side surface, a trailing edge, with the leading and trailing edges intersecting at a fin tip. At least one flexible spine having an elongate body with a first end spaced apart from a second end. Each flexible spine is molded from a composition of fibres and resin using a continuous molding process. The at least one flexible spine is bonded to be fixed between the first and second side surfaces of the fin. The number, placement and size of the at least one flexible spine provides the fin with a customised dynamic flex pattern and strength.

18 Claims, 33 Drawing Sheets

(51) Int. Cl.
*B32B 17/10* (2006.01)
*B63B 32/66* (2020.01)

(58) Field of Classification Search
CPC .... B63H 16/04; B63H 25/38; B32B 2605/12; B32B 17/10; B32B 2262/101; B32B 3/06; B32B 2250/40; B32B 1/00; B32B 3/08; B32B 3/12; B32B 5/18; B32B 5/245; B32B 17/04; B32B 21/10; B32B 27/12; B32B 2260/023; B32B 2260/046; B32B 2262/0253; B32B 2262/0269; B32B 2262/062; B32B 2262/106; B32B 2262/108; B32B 2266/0235; B32B 2266/0278; B32B 2307/51; B32B 2307/56; B32B 5/26; B32B 5/02; B32B 27/304; B32B 27/40; B29L 2031/5272; B29C 33/0044; B29C 70/48; B29C 70/52
USPC ...................................................... 441/74, 79
See application file for complete search history.

(56) References Cited

U.S. PATENT DOCUMENTS 6,896,570 B1 5/2005 O'Keefe et al.
2013/0244514 A1* 9/2013 Scott ...................... B63B 32/62 441/79
2015/0225044 A1 8/2015 Longo et al.
2020/0017174 A1* 1/2020 Holloway ............... B63B 32/57

OTHER PUBLICATIONS

Chapter 5 "Plastic and Composites Processing." Manufacturing Process Selection Handbook [online]. Butterworth-Heinemann, 2013 [retrieved on Feb. 11, 2026]. Retrieved from the Internet: <URL: https://www.sciencedirect.com/science/article/pii/B9780080993607000057> (Year: 2013).*
Australian Patent Office, International Search Report for PCT/AU2022/050225, mailed Jun. 1, 2022, 5 pages.
Australian Patent Office, Written Opinion of the International Searching Authority for PCT/AU2022/050225, mailed Jun. 1, 2022, 4 pages.

* cited by examiner

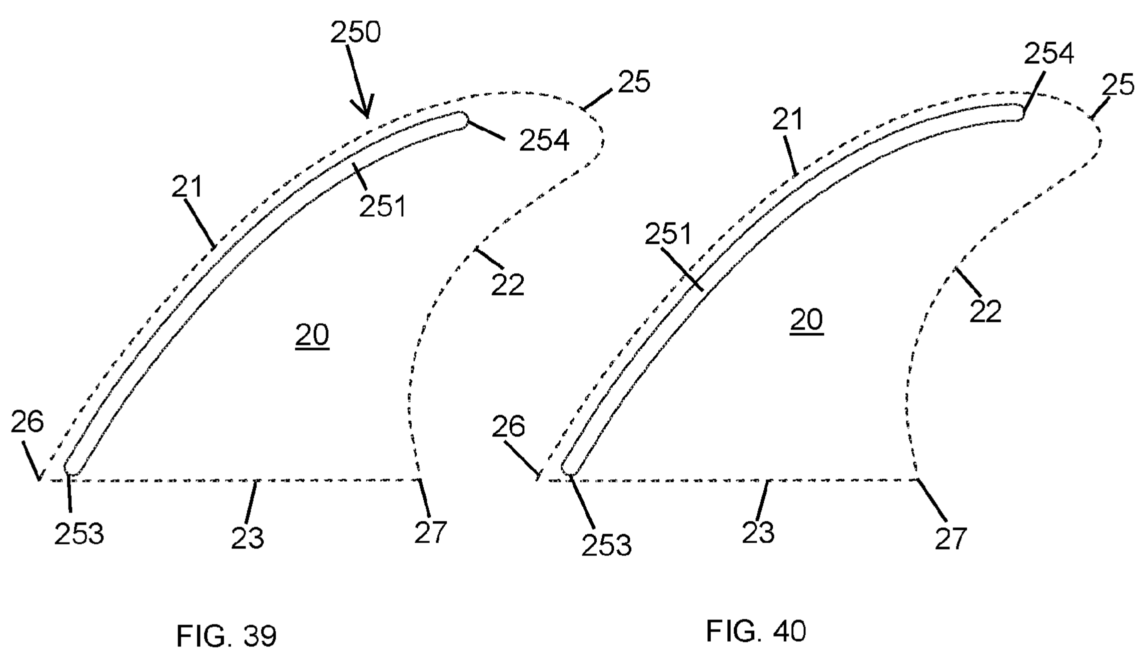
FIG. 39
FIG. 40
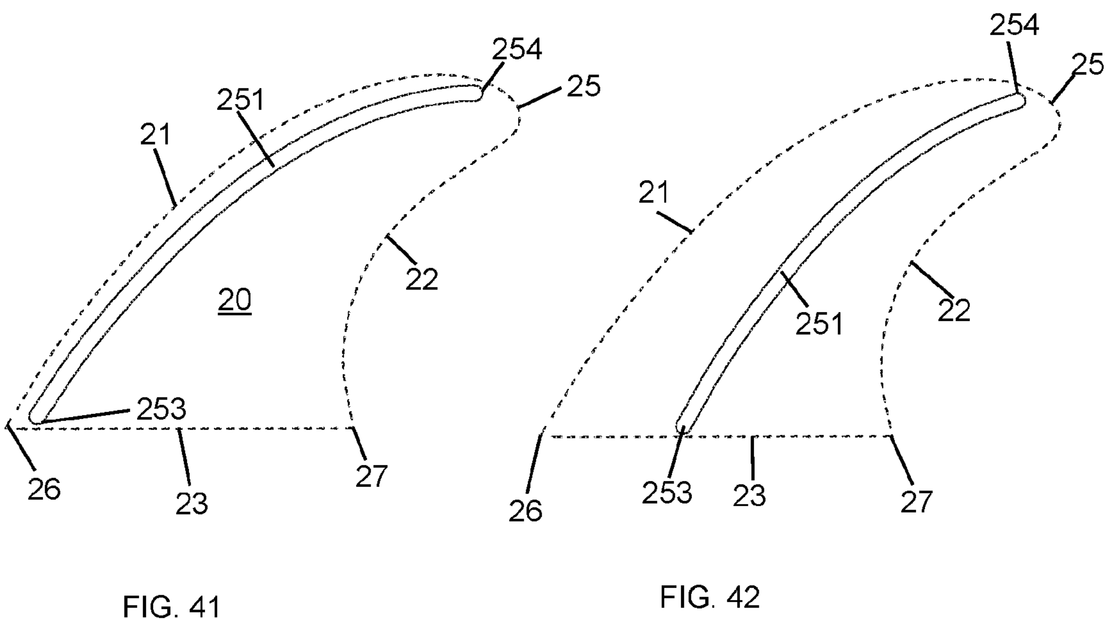
FIG. 41
FIG. 42

254
251
21
254
251
20
22
26
253
23
253A
27

254
25
251
254
251
22
21
20
27
253
23
253
26

254
25
251
254
21
251
20
22
27
26
253A
23
253A 254
25
254
251
21
251
22
20
23
253
27
26
253A 254
25
21
251
254
22
20
251
26
23
253A
27
253A 254
25
21
251
254
22
20
251
26
27
253
253
23

254
251
25
21
22
20
26
253A
23
27

254
25
251
21
22
20
27
26
253A
23

254A
251
25
21
22
20
26
253A
23
27

254A
25
251
21
22
20
26
253
27

23
254
25
21
251
22
20
26
253A
23
27

254
25
21
251
22
20
26
253A
23
27

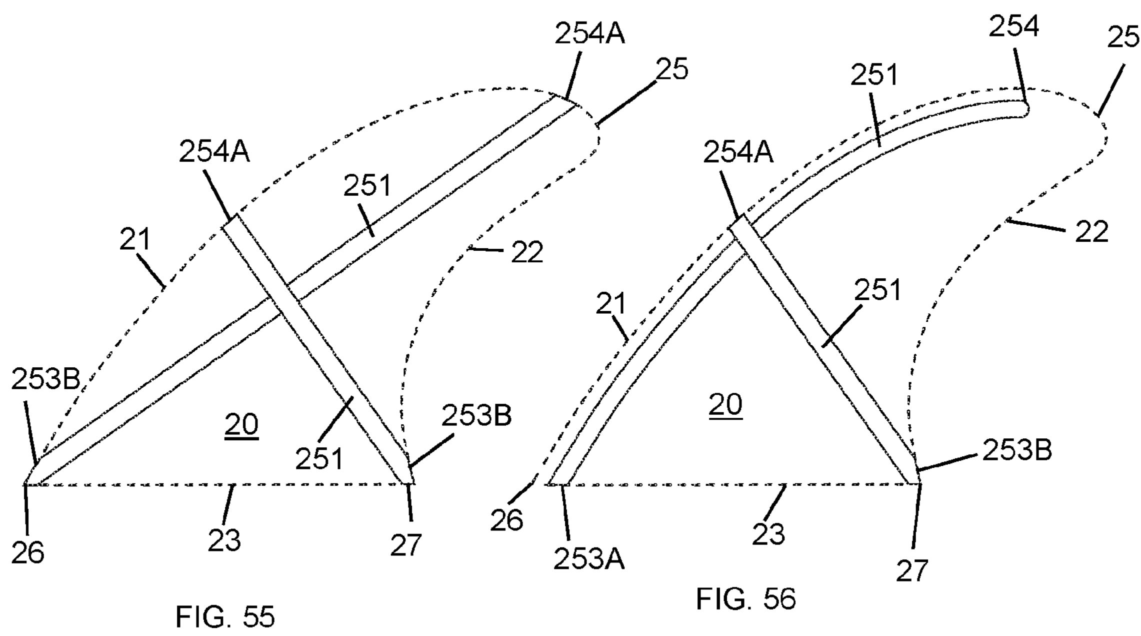
FIG. 55
FIG. 56
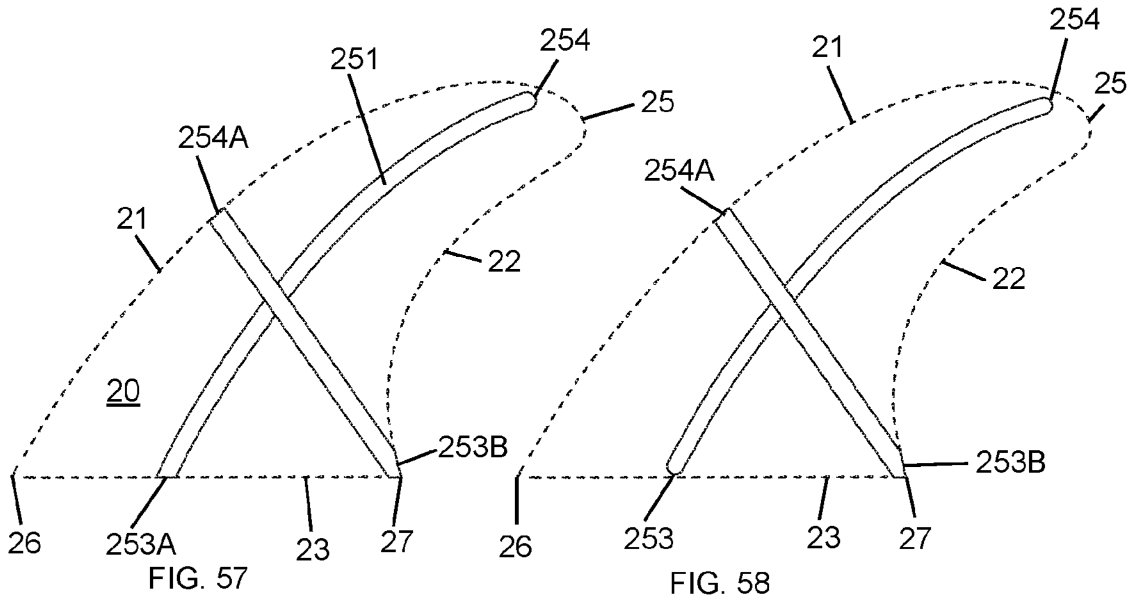
FIG. 57
FIG. 58

WATERCRAFT FIN

CROSS-REFERENCE TO RELATED APPLICATIONS

The present application is a U.S. national stage application of International Application No. PCT/AU2022/050225, filed Mar. 16, 2022, which claims priority to and the benefit of AU 2021900783, filed Mar. 18, 2021, the contents of which are incorporated herein by reference and made a part hereof.

FIELD OF THE INVENTION

The present invention relates generally to fins and methods of manufacturing fins as may be applied to watercraft. In particular, the present invention provides a fin with a flexible spine for enhancing the overall flex characteristic of the fin.

BACKGROUND OF THE INVENTION

It should be noted that reference to the prior art herein is not to be taken as an acknowledgement that such prior art constitutes common general knowledge in the art.

Many water sports and aquatic activities use water-borne vessels having fins or keels located beneath the surface of the vessel. A surfboard fin is typically located on the tail of the surfboard at the bottom of the board. The fins can be fixed or secured to the surfboard through various methods such as adaptable fin systems or glassed on to the surfboard as a permanent fixture. The fin is used to adjust or use the water flow beneath the board to improve stability, controlling direction and facilitating turning of the surfboard. The fins level of flexibility, its size, its curves and its surface area all affect the water flow beneath the surfboard and how the surfboard reacts to steering operations. Fins may be arrayed in different numbers and configurations on the bottom of a surfboard. Likewise, fins come in many different shapes, sizes, and are manufactured or formed from many different materials.

In use, a fin is subjected to a number of forces including side-ways and other forces on the faces of the fin. How the fin reacts to these forces in turns and other manoeuvres can affect the performance of the surfboard. In particular, the fin will bend between the base and the tip of the fin and twist between the leading and trailing edges of the fin. The material bending or flex of a fin in the water is an important aspect of a modern surfboard fin and allows the fin material to bend without breaking and can directly relate to fin performance. Flex will contribute to a surfer's projection out of turns, which in turn will produce speed and effect control. Likewise, the rigidity or stiffness of the fin provides the strength and prevents the fin from breaking. Flex provides the ability to store potential energy, return the fin to its original shape, release the stored potential energy, and turn it into kinetic energy or acceleration. Thus, there must be a balance between the rigidity and flex or bending of the fin to prevent the fin from breaking during use. This balance also greatly effects the way in which the fin performs.

Traditional construction of a fin involves laying up multiple layers of fiberglass cloth and resin and then cutting and foiling the fiberglass fin shape by hand to produce the required aerodynamic fin shape. These fins are strong and can basically be made just as stiff as you want them to be. Composite fins that use more than one material within the construction or within the core of the fin have provided advancements in fin construction, however these have only led to further limitations.

Today, composite fins are generally made of a composite and some form of reinforcement. The reinforced fabric material may include materials such as fibreglass, carbon, an aramid fibre, or a polyolefin fibre to add surface strength and control flex in the fin. A core can also be added to the fin from various materials. The most popular core going around high performance fins at the moment is generally a honeycomb/hexagonal design that is made from lightweight materials. The fibreglass fabric and the core material together with the impregnating resin material determine the physical properties of the fin. This can include but is not only limited to the stiffness characteristics, bending resistance, twisting resistance and/or flexibility of the fin to sideways and other forces on the fin in use. The core creates less weight hence helps produce light-weight fins.

Manoeuvrability is governed primarily by the shape, design, the foam, and the weight distribution of the surfboard which is typically augmented by the addition of one or more specially shaped fins on its underside. Weight is an important consideration in achieving manoeuvrability as minimum weight is a key factor in achieving ease of turning and the general generation of speed. The weight of the fin is an important factor in the design process and adding reinforced fabrics can be problematic. Most users aim to have a surfboard which is as light as possible. This is particularly relevant in small to medium size surf, where surfers do not want equipment that feels heavy due to creating drag and making it harder to generate speed. The general market perception is that since fins are added on to the surfboard, the lighter the fin the more attractive it is to the consumer, particularly for performance surfboards. It is also known that by producing a fin with many layers of reinforcing fabric with impregnating resin matrix contributes to the stiffness or flexibility across the fin. There is also the additional limitation of what is commercially available in reinforcing fabrics and the strand materials forming them. Likewise, many lightweight fins have too much flex which effects performance, making the surfboard sluggish through turns and not responsive enough for the surfer.

The most common construction technique for making these fins is called resin transfer molding or RTM. This process involves injecting a liquid thermoset resin to saturate the fiberglass preform which is pre-cut to the required shape within a mould that results in a fin that's both lightweight and relatively strong. While this process is great to produce on mass, it is still labour intensive and difficult to achieve the desired flex pattern, whilst minimising weight, and achieving consistent results. Relying on existing materials means that there are consistent variables including human intervention, environmental conditions-hot and cold days will produce different outcomes, and raw materials also have variations.

Alternatively, another construction technique used to produce purely fibreglass fins is the automated computer numerical control (CNC) cutting of the fin from a fibreglass panel. The fins produced from CNC cutting are not a precision product as the CNC machine generally only cuts out a basic 2D shape. The fins will still need to be hand foiled after the 2D fin shape is cut from the fibreglass. The key foiling is still relied on by human hand sanding. These fins have high rigidity (stiffness) and are relatively heavy which makes them undesirable for a large part of the fin market.

Conventional fins formed by the above techniques all suffer from inconsistent rigidity throughout the fin and they are heavier in weight than other types of fins. This inconsistent rigidity is known as a torsion flex, which causes the fin to be non-uniform in its flex and can cause a surfboard to lose its drive, speed and greatly affect manoeuvrability. One technique to overcome the issue of governing flex is to place a reinforcement layer within the fin. However, this technique significantly increases the cost of the fin and the labour in fin construction. Reinforcement materials such as carbon, Innegra and Kevlar are currently used to add surface strength to fins and control flex. These materials are applied by hand lamination or RTM and can be very labour intensive and add further cost to the fin.

The application of these reinforcement materials and other current known flexible fins still suffer from problems due to elasticity and increased or decreased recoil rates. In use, when the fin interacts with water flows on the face of a wave the increasing water pressure or hydrodynamic pressure on the surfaces of the fin cause the fin to deform. Elasticity is the ability of the fin body to return to its original shape when the forces of the water on the faces of the fin which cause the fin to deform are removed. The time it takes for the fin to return to its original shape is the recoil rate. The current known reinforced and flexible fins all suffer from a long recoil rate and in some cases the elasticity of the fin is excessive to a point that over time the fin does not return to its original shape.

Surfboards and fins are dynamic objects that are impacted by external factors (such as wind and wave chop) that naturally cause vibration through the surfboard. The known flexible fins all generally have a higher vibration frequency due to material compositions and construction methods. In respect to performance, vibration inherently affects the way a fin will behave, influencing a surfer's response regarding how a "board feels" and ultimately how it performs across a variety of conditions. Fins with a high vibration frequency can result in a reduction of speed, making it more challenging to engage the rail, control, and maneuverer. It is difficult to create a smooth ride when a surfboard is experiencing chatter. Likewise, with an over damped vibration frequency is difficult to generate speed and hard to maneuverer (hence, the board feels 'sluggish' or 'dead'). The vibration of the fin increases the frictional force of the water on the fin and reduces the surfboards control and speed.

Clearly it would be advantageous if a watercraft fin and method of manufacturing the watercraft fin could be devised that helped to at least ameliorate some of the shortcomings described above. In particular, it would be beneficial to provide a fin with a flexible spine for enhancing the overall flex characteristic of the fin and that helped to at least ameliorate some of the shortcomings described above.

SUMMARY OF THE INVENTION

In accordance with a first aspect, the present invention provides a fin for a watercraft comprising: a substantially planar member having a first side surface, a leading edge, a second side surface opposite the first side surface, a trailing edge opposite the leading edge, and a base providing an area for attachment to a watercraft surface by either mechanical means or permanent bonding, wherein the leading edge and the trailing edge intersect at a fin tip; at least one flexible spine having an elongate body with a top side, a bottom side, a first end spaced apart from a second end and peripheral edges joining the top and bottom sides such that a spine width associated with at least the top side is greater than a spine thickness associated with the peripheral edges, each flexible spine is molded from a composition of fibres and resin using a continuous molding process; and wherein the at least one flexible spine is bonded to be fixed between the first and second side surfaces of the fin; and wherein the placement and size of the at least one flexible spine between the first and second side surfaces of the fin, provides the fin with a customised dynamic flex pattern and strength.

Preferably, the fin may further comprise a leading corner formed at the junction of the leading edge and one end of the base, and a trailing corner formed at the junction of the trailing edge and a second end of the base.

Preferably, the fin may further comprise a centre line axis extending from the leading corner to the fin tip.

Preferably, the at least one flexible spine may be formed from a composition comprising a plurality of unidirectional fibres and a resin, the composition of fibres and resin forming an elastically deformable spine. The fibres of the flexible spine composition may be unidirectional in relation to a length of the flexible spine. The fibres may be selected from the group consisting of: glass fibres, cellulose fibres, carbon fibre composites, basalt fibres, synthetic fibres or any combination thereof, wherein the glass fibres are E-glass or S-glass fibres, and wherein the synthetic fibres are aramid fibres or polyolefin fibres. The resin of the flexible spine composition may be selected from the group consisting of: vinyl ester resins, epoxy resins, and polyester resins.

Preferably, the composition of fibres and resin in the at least one flexible spine may have been designed to have a chemical structure that bonds with the fins materials and resin to ensure a strong unified fin structure, the structure providing a fin that will may have a longer life span while providing the desired flex pattern and strength properties to provide enhanced performance characteristic to suit an end user.

Preferably, the continuous molding process may be a pultrusion process whereby the fibres are saturated with a liquid polymer resin and then formed and pulled through a heated die to form the corresponding flexible spine.

Preferably, the composition of fibres and resin and the position of the at least one flexible spine between the first and second side surfaces of the fin may provide the fin with a controlled vibration frequency and greater dampening properties than traditional fins.

Preferably, in use, when an increased vibrational friction is experienced by the fin the at least one flexible spine may provide the fin with improved damping properties by controlling the vibration frequency of the fin and thereby providing the user with a balanced feel between control and manoeuvrability and the benefit of optimal acceleration and speed.

Preferably, the at least one flexible spine may be an elongate member formed in different lengths, widths, depths, cross-sectional shapes and end profiles to be accommodated in different positions within different sized and shaped fins.

Preferably, the first and second ends of the at least one flexible spine may have an end profile formed in any shape. Alternatively, the first and second ends of the at least one flexible spine may have an end profile formed from at least one of a semicircular shape and a rectangular shape.

Alternatively, the first and second ends of the at least one flexible spine may have an end profile formed to correspond substantially with the shape of the edge, base, corner or tip of the fin to which the first and second ends are located adjacent thereto.

Preferably, the at least one flexible spine may comprise a uniform cross-section throughout its length. Alternatively, the at least one flexible spine may comprise a non-uniform cross-section throughout its length.

Alternatively, the at least one flexible spine may comprise a cross-section which tapers from the first end to the second end of the at least one flexible spine. The cross-section may taper in thickness axially along the length of the at least one flexible spine from the first end to the second end.

Further alternatively, the at least one flexible spine may have a section of uniform cross-sectional shape extending from the first end for a substantial length of the at least one flexible spine and a tapered section extending from the uniform section to the second end. The uniform section may comprise approximately two thirds of the length of the at least one flexible spine and the tapered section may comprise approximately one third of the length of the at least one flexible spine.

Preferably, the fin may further comprise a core located within the planar member and positioned between the first and second side surfaces. The core may have a first portion extending from the base of the fin and a peripheral edge portion running parallel with and spaced apart a distance from the leading and trailing edges of the fin, the first portion extending along substantially the length of the base. The core may be at least one of a solid material and a foam material, the solid material core is selected from any one of a resin impregnated fibre glass, a hardened resin, a plastics material, bamboo or wood, the foam material core is selected from any one of a polyvinyl chloride (PVC) foam material or a polyurethane (PU) foam material.

Preferably, the core may be formed from a plurality of hexagonal prisms forming a honeycomb/hexagonal shaped design.

Preferably, the at least one flexible spine may be positioned on a side of the core and between the core and either the first or second side surfaces.

Alternatively, one of the at least one flexible spines may be positioned on each side of the core and between the core and the first side surface and the core and the second side surface of the fin.

Preferably, the at least one flexible spine may be aligned with the centre line axis of the fin.

Preferably, the at least one flexible spine may further comprise a plurality of apertures passing through the elongate body of the at least one flexible spine, the apertures may be adapted to allow a chemical bonding agent to pass therethrough to aid in securing the bonding of the at least one flexible spine to the fin.

Preferably, the apertures may be passages extending along the elongate body of the at least one flexible spine.

Alternatively, the apertures may be at least one of any shaped hole, any shaped passage and any shaped slot formed in the elongate body of the at least one flexible spine.

Preferably, the chemical bonding agent may be at least one of an adhesive and a resin.

Preferably, the at least one flexible spine may further comprise a conductive material encapsulated within the elongate body of the at least one flexible spine, the conductive material allows the flow of an electrical current in one or more directions. The conductive material may be selected from the group consisting of: metals, electrolytes, superconductors, semiconductors, plasmas, non-metallic conductors or any combination thereof, and wherein the non-metallic conductors are graphites or polymers. The conductive material may be an insulated copper cable running substantially along the length and within the at least one flexible spine.

Preferably, the fin may be manufactured from a fibreglass material or a fibreglass composite material.

Preferably, the fin may be manufactured using a resin transfer moulding (RTM) process or may be machined from a fibreglass panel.

Preferably, when the fin may be manufactured using the RTM process the at least one flexible spine may be placed in a fin mold and layers of fibreglass are placed around the at least one flexible spine prior to a resin being injected into the mold. The fin produced using the RTM process may further comprises a core to which the at least one flexible spine is positioned thereon in the fin mold and the layers of fibreglass are placed around the at least one flexible spine prior to the resin being injected into the mold.

Preferably, when the fin may be machined from a fibreglass panel the process comprises cutting the fin from the fibreglass panel using an automated computer numerical control (CNC) cutting machine, the fin further comprises at least one slotted aperture formed in any one or more of the first and second surfaces, the slotted aperture extends into the enclosed space of the fin and extends from adjacent the leading corner to adjacent the fin tip, and the at least one flexible spine is bonded to be fixed within the at least one slotted aperture and between the first and second side surfaces of the fin. The machined fin may further comprise a core and the at least one slotted aperture extends into the enclosed space of the fin but the slotted aperture does not penetrate the core.

Preferably, a slotted aperture may be machined into both the first and second surfaces on both sides of the core, both slotted apertures containing one of the at least one flexible spine therein.

Alternatively, when the fin may be machined from a fibreglass panel, the panel may comprise the at least one flexible spine contained within the panel, the machining process comprises cutting the fin and the at least one flexible spine from the fibreglass panel using an automated computer numerical control (CNC) cutting machine.

Preferably, when the fin has been manufactured using the resin transfer moulding (RTM) process or is machined from the fibreglass panel, the at least one flexible spine may remain flexible within the fin to provide the customised flex pattern and strength for the fin.

Preferably, wherein in use the at least one flexible spine may be configured to react to increasing water pressure or hydrodynamic pressure on an inner or outer radius surface of the fin during a directional change by flexing laterally and reducing disproportionate water pressure or hydrodynamic pressure on the fin first and second side surfaces and decreasing the development of a low pressure core and subsequent cavitation flow in the laminar flow boundary of the leading edge of the fin, thus improving dimensional stability and control of the watercraft to which the fin is attached.

Preferably, the at least one flexible spine may be configured to react to increasing water pressure or hydrodynamic pressure on an inner or outer radius surface of the fin during a directional change by flexing laterally and producing a dampening effect and reducing a vibration frequency of the fin, the dampening effect reducing disproportionate water pressure or hydrodynamic pressure on the fin first and second side surfaces and decreasing the development of a low pressure core and subsequent cavitation flow in the laminar flow boundary of the leading edge of the fin, thus improving dimensional stability and control of the watercraft to which the fin is attached.

Preferably, the area for attachment to a watercraft surface may be the mechanical means, the fin may further comprise a board coupling assembly structured to secure the fin to the watercraft, the board coupling assembly comprises at least one plug sized to be inserted into at least one mounting socket in a surface of the watercraft.

Preferably, the substantially planer member may be a vertical rigid convex foil with the leading edge curving from the leading corner of the fin base to the fin tip, the first and second side surfaces extending from the leading edge and terminating at the trailing edge curving from the fin tip to the trailing corner of the fin base, wherein both the leading and trailing edges intersect at the fin tip.

Preferably, the at least one flexible spine is a non-woven flexible spine.

In accordance with a further aspect, the present invention provides a method of forming a fin configured for use with a watercraft, the method comprising the steps of: i) providing a mold having a mold cavity at least partially defined by a first mold cavity face and an opposed second mold cavity face; ii) placing a pre-cut fibreglass-preform onto the first mold cavity face, the fibre-preform comprising at least one fibre-reinforced sheet having a plurality of structural strands and at least one flexible spine; iii) closing and clamping the mold to secure the fibre-preform between the first and second mold cavity faces; iv) injecting a resin under pressure into the mold, the injected resin impregnates the fibre-preform and adheres the fibre-reinforced sheet to the at least one flexible spine; v) leaving the fin in the mold until the fin is set (without heating); vi) placing the fin in an oven and baking (a final cure) the fin for a predetermined amount of time in order to gel and cure the fibreglass-preform and resin to form a solid composite fin; vii) opening the mold and removing the fin from the mold; and viii) finishing the fin by edge trimming and any final finishing is applied to the fin.

Preferably, step i) may further comprise applying a release agent to the mold prior to placing the fibre-preform in the mold, the release agent facilitates the easy removal of the solid composite fin from the mold. The release agent may be a gel coat, the gel coat is composed of a resin selected from the group consisting of a polyester based resin, an epoxy based resin, or a coloured resin. Alternatively, the release agent may be a mold release wax.

Preferably, step iv) may further comprise increasing the pressure within the mold to ensure that any remaining porosity within the combined fibre-preform and resin is collapsed.

Preferably, the resin may be a low viscosity thermosetting resin. The low viscosity resin may be selected from the group consisting of: vinyl ester resins, epoxy resins, or polyester resins.

Preferably, the fibre-preform may further comprise a core inserted between the fibre-reinforced sheets with the at least one flexible spine positioned upon the core.

Preferably, the fin may further comprise any one or more of the features of the first aspect.

In accordance with a still further aspect, the present invention provides a method of forming a fin configured for use with a watercraft, the method comprising the steps of: i) providing a fibreglass panel; ii) cutting the fin from the fibreglass panel using an automated computer numerical control (CNC) cutting machine; iii) providing at least one flexible spine, the at least one flexible spine is bonded to be fixed within the fin cut from the fibreglass panel; and iv) finishing the fin by sanding and cleaning the fin.

Preferably, step iii) may further comprise routing at least one longitudinally extending slotted aperture in any one or more of a first side surface or a second side surface of the fin, such that the slotted aperture extends into the enclosed fin space and the at least one flexible spine is bonded to be fixed within the routed slotted aperture and between the first and second side surfaces of the fin.

Preferably, step i) may further comprise providing a core within the fibreglass panel and the at least one slotted aperture extends into the enclosed space of the fin but the slotted aperture does not penetrate the core.

Preferably, the fin may further comprise and one or more of the features of the first aspect.

In accordance with a still further aspect, the present invention provides a method of forming a fin configured for use with a watercraft, the method comprising the steps of: i) providing a fibreglass panel with a core and at least one flexible spine embedded within the panel; ii) cutting the fin from the fibreglass panel using an automated computer numerical control (CNC) cutting machine; and iii) finishing the fin by sanding and cleaning the fin.

Preferably, the fibreglass panel may have two flexible spines embedded on opposing sides of the core.

Preferably, the fin may further comprise any one or more of the features of the first aspect.

In accordance with a still further aspect, the present invention provides a fin for a watercraft comprising: a substantially planar member having a first side surface, a leading edge, a second side surface opposite the first side surface, a trailing edge opposite the leading edge, and a base providing an area for attachment to a watercraft surface by either mechanical means or permanent bonding, wherein the leading edge and the trailing edge intersect at a fin tip; at least one flexible spine having an elongate body with a first end spaced apart from a second end, each flexible spine is molded from a composition of fibres and resin using a continuous molding process; and wherein the at least one flexible spine is bonded to be fixed between the first and second side surfaces of the fin; and wherein the number, placement and size of the at least one flexible spine between the first and second side surfaces of the fin, provides the fin with a customised dynamic flex pattern and strength.

Preferably, the at least one flexible spine may be an elongate cylindrical tube.

Preferably, the fin may further comprise and one or more of the features of the first aspect.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIGS. 39 to 58 illustrate the flexible spine of FIG. 38 and variations thereof located in positions within the fin to enhance the overall flex characteristic of the fin.

DETAILED DESCRIPTION OF THE PREFERRED EMBODIMENTS

Figure 1:
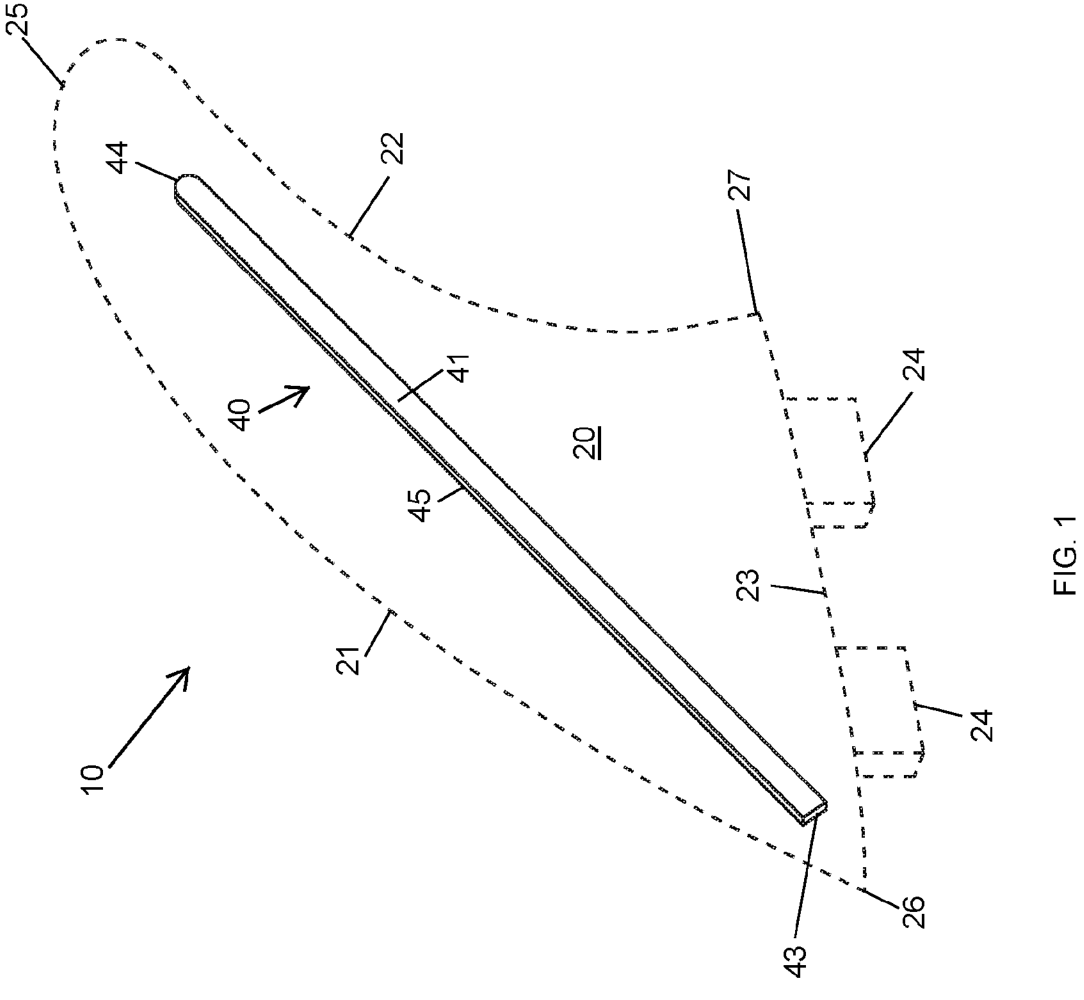
FIG. 1 shows a perspective view of a fin in accordance with an embodiment of the present invention.

The following description, given by way of example only, is described in order to provide a more precise understanding of the subject matter of a preferred embodiment or embodiments.

The present invention was designed to provide a fin 10 with at least one flexible spine 40 for use with watercraft such as surfboards. The invention will be described primarily for use with watercraft such as surfboards, however, the invention is not limited to that particular field of use and is also applicable to other surf craft including surf skis, stand-up paddleboards (SUP's), wakeboards, skim boards, surf lifesaving boards including nipper and racing mals, body boards and wind surfing boards and to watercraft including sailboards and the like.

The flexible spine 40 in one embodiment is bonded within the fin 10 during the molding process for manufacturing the fin 10. Alternatively, the flexible spine 40 may be embedded within a fibreglass panel and the fin 10 machined from the fibreglass panel by any known process. Further alternatively, the fin 10 may be first machined from the fibreglass panel and a longitudinal slot or recess routed within one or both side faces of the fin 10 for receiving one or more flexible spines 40 therein. The flexible spine 40 is bonded and fixed between the first and second side surfaces 20, 28 of the fin 10. When inserted into the slot or recess the flexible spine 40 is bonded therein using an adhesive or a resin or the like. By way of example only, the adhesive or resins include epoxy resin, polyester resin, and vinyl ester resin.

The flexible spine 40 is recessed within and under the fin 10 lamination. The flexible spine 40 is elastically deformable in that the flexible spine 40 will change in shape due to an applied force such as the result of tensile (pulling) forces, compressive (pushing) forces, shear, bending or torsion (twisting). The flexible spine 40 is elastically deformable which means the deformation is reversible. Once the forces are no longer applied, the flexible spine 40 will return to its original shape, that is, the flexible spine 40 will bend as forces are applied and removed to the fin 10. The flexible spine 40 also provides the fin 10 with a dampening effect which ensures that the recoil rate of the fin 10 from when the forces are removed to when the fin 10 returns to its original shape is significantly reduced. In use, when the fin 10 interacts with water flows on the face of a wave the increasing water pressure or hydrodynamic pressure on the side surfaces 20, 28 of the fin 10 cause the fin 10 to deform. The deformation creates a vibration frequency which is the rate at which the fin vibrates. The flexible spine 40 reduces the vibration frequency and therefore somewhat mitigates the friction between the water pressure or hydrodynamic pressure on the side surfaces 20, 28 of the fin 10 which cause the fin 10 to deform. The flexible spine 40 thereby provides the user with a more balanced feel between control and manoeuvrability which benefits optimal acceleration and speed.

Elasticity is the ability of the fin body to return to its original shape when the forces of the water on the side faces 20, 28 of the fin 10 which cause the fin 10 to deform are removed. The time it takes for the fin 10 to return to its original shape is the recoil rate. The flexible spine 40 provides the fin 10 with both elasticity and dampening. The elasticity allows the fin 10 to deform and return to its original shape. Without some form of elasticity, the fin 10 would be too stiff and break easily and without any dampening the fin 10 would not smoothly return to the equilibrium position or original shape. The flexible spine 40 ensures that the fin 10 returns to the equilibrium position fast and smoothly. The number, position, and size of flexible spines 40 within the fin 10 determines the customised dynamic flex pattern of the fin 10 and provides a fin 10 that is strong which will flex without breaking.

The ability of the flexible spine 40 to elastically deform and return to its natural shape is determined by the composition of fibres and resin in the flexible spine 40 and the positioning of the flexible spine 40 within the fin 10. The ability to elastically deform and return to its natural shape allows a fin designer to improve the tensile strength, flexural modulas, elongate at break and compressive strength of the fin 10 in a new and innovative manner. By elongation at break, we mean that the flexible spine 40 improves a fins 10 ability to absorb load and flex while still returning to the natural elongate state without failure. The flexural modulus refers to the ratio of stress to strain in flexural deformation, or the tendency for the flexible spine material to resist bending. The addition of the flexible spine 40 delivers a specific flex by increasing the levels of flexural modulus to the fin 10.

The elasticity and dampening of the flexible spine 40 is due to the continuous pultrusion molding process and the composition of fibres and resins which form the flexible spines 40 of different length, width, height, and cross-sectional shape. The continuous molding process is a pultrusion process whereby the fibres are saturated with a liquid polymer resin and then formed and pulled through a heated die to form the corresponding flexible spine 40. Each flexible spine 40 consists of a composition comprising a plurality of unidirectional fibres and a resin, the composition of fibres and resin forming an elastically deformable spine 40. The fibres of the flexible spine composition are unidirectional in relation to the length of the flexible spine 40.

The non-woven molded flexible spine 40 can be formed in any shape and with any end profile to suit the position within the fin 10 and/or the size and shape of the fin 10. Typically, each flexible spine 40 has an elongate body with an elongate body with a top side 41, a bottom side 42, a first end 43 spaced apart from a second end 44 and peripheral edges 45 joining the top and bottom sides 41, 42 such that a spine width associated with at least the top side 41 is greater than a spine thickness associated with the peripheral edges 45. The flexible spine 40 is bonded to be fixed between the first and second side surfaces 20, 28 of the fin 10.

Each non-woven molded unidirectional fibre flexible spine 40 is formed from a composition of a plurality of straight fibres aligned linearly and a resin. Each flexible spine 40 consists of a composition of linearly aligned non-woven fibres. That is, the fibres are neither woven nor knitted to form the flexible spine 40. The flexible spine 40 is formed of a plurality of linearly aligned non-woven fibres defining a sheet or web structure bonded together by entangling fibre or filaments mechanically, thermally, or chemically. The composition of fibres and resin form an elastically deformable spine 40. The fibres are selected from the group consisting of glass fibres such as fibreglass, E-glass or S-glass fibres, carbon fibre composites, basalt fibres, cellulose fibres, and synthetic fibres such as polyolefin fibres such as Innegra and aromatic polyamides such as Aramid, and environmentally friendly fibres such as cellulose, hemp, bamboo, flax and tencel. For example, fibreglass is a type of fibre-reinforced plastic where the reinforcement fibre is specifically glass fibre. The plastic matrix may be a thermosetting plastic—most often epoxy, polyester resin—or vinyl ester, or a thermoplastic. The glass fibres are made of various types of glass depending upon the fiberglass use. These glasses all contain silica or silicate, with varying amounts of oxides of calcium, magnesium, and sometimes boron.

The synthetic fibres are made from synthesized polymers or small molecules. The compounds that are used to make fibres are derived from raw materials such as petroleum based chemicals or petrochemicals. These materials are polymerized into a long, linear chemical that bond two adjacent carbon atoms. Differing chemical compounds will be used to produce different types of fibres. By way of example only and by no way limiting, the types of synthetic fibre used in the flexible spine 40 are the Aramid fibre, such as Kevlar or the polyolefin fibre, such as Innegra and polypropylenes.

The resins used in the flexible spine 40 are typically a solid or highly viscous substance, which are convertible into polymers. Such viscous substances can be plant-derived or synthetic in origin. They are often mixtures of organic compounds. By way of example only and by no way limiting on the type of resin used in the flexible spine 40, the resins could be selected from the group consisting of Vinyl Ester resins, Epoxy resins, or Polyester resins.

The composition of fibres and resins in the flexible spine 40 have been designed to have a chemical structure that bonds with the fin materials and resin to ensure a strong unified fin 10 structure. The structure will provide a fin 10 that will have a longer life span while providing a desired flex pattern and strength properties to provide an enhanced performance characteristics to suit an end user or surfer.

The present invention came about due to a long felt need in the marketplace to improve the flex and increase the physical strength and durability of fins 10 by improving the tensile strength and compressive strength in a new and innovative manner. It was also found that by using the flexible spine 40 an improved fin and surfboard performance was achieved through optimising flex. The flexible spine 40 also provides the fin 10 with an improvement in the recoil rate or speed upon which the fin 10 returns to its original shape through the dampening effect of the flexible spine 40. By controlling the flex pattern of the fin 10 ultimately affects the way the water flows beneath the board to improve stability, controlling direction and facilitating turning of the surfboard. The fins 10 level of flexibility, its size, its curves, and its surface area all affect the water flow beneath the surfboard and how the surfboard reacts to steering operations. The combination of elasticity and dampening provided by the flexible spine 40 allows a fin 10 which in use returns to its equilibrium position smoothly and quickly and provides a fin 10 which is durable in all conditions.

In use the addition of a non-woven molded unidirectional fibre reinforced flexible spine 40 to the fin 10, allows the fin 10 to be configured to react to increasing water pressure or hydrodynamic pressure on an inner or outer radius surface of the fin during a directional change by flexing laterally and reducing disproportionate water pressure or hydrodynamic pressure on the fin first and second side surfaces 20, 28 and decreasing the development of a low pressure core and subsequent cavitation flow in the laminar flow boundary of the leading edge 21 of the fin 10, thus improving dimensional stability and control of the watercraft to which the fin 10 is attached.

Figure 3:
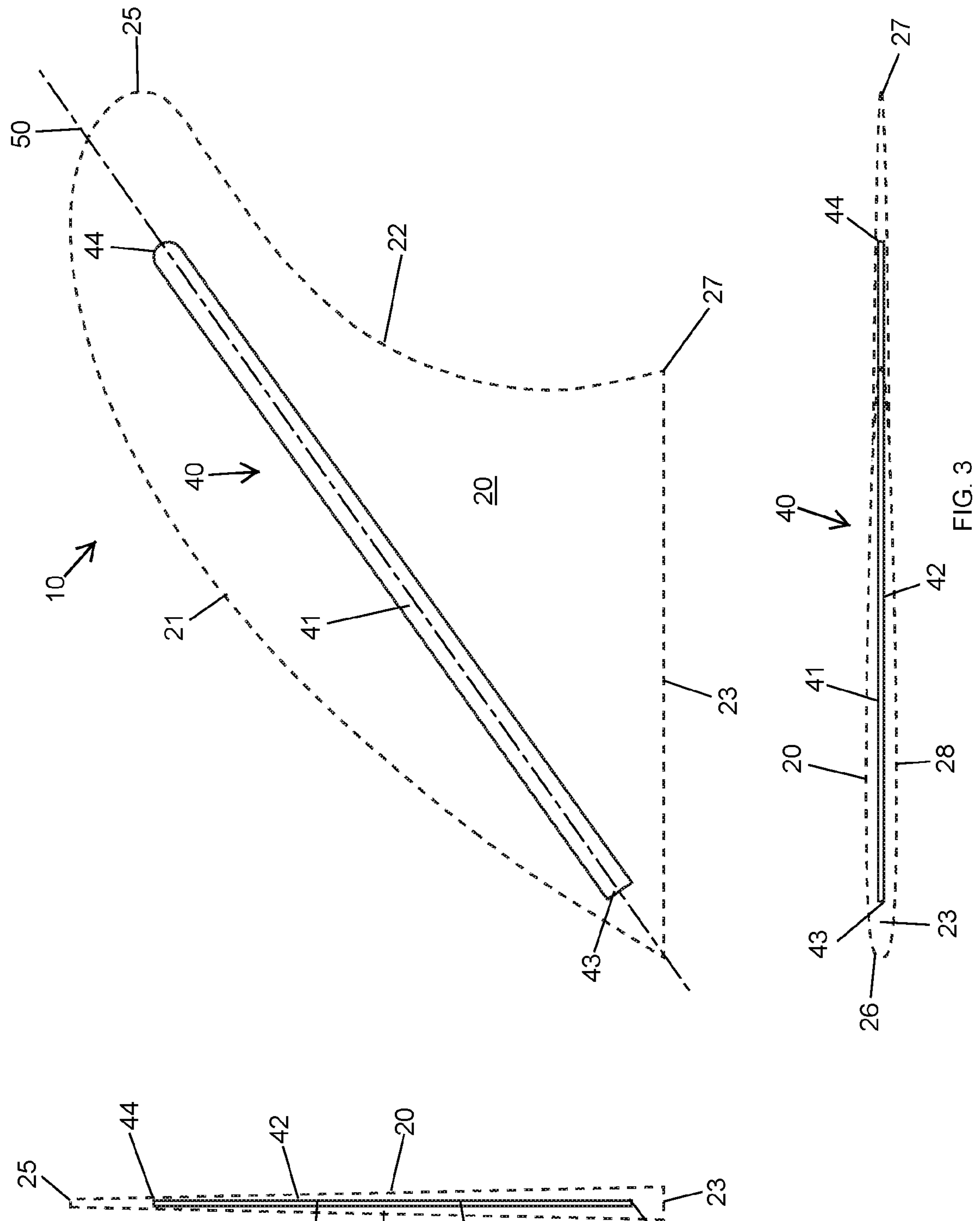
FIG. 3 shows front, side, and bottom views of the fin in FIG. 1.
Figure 4:
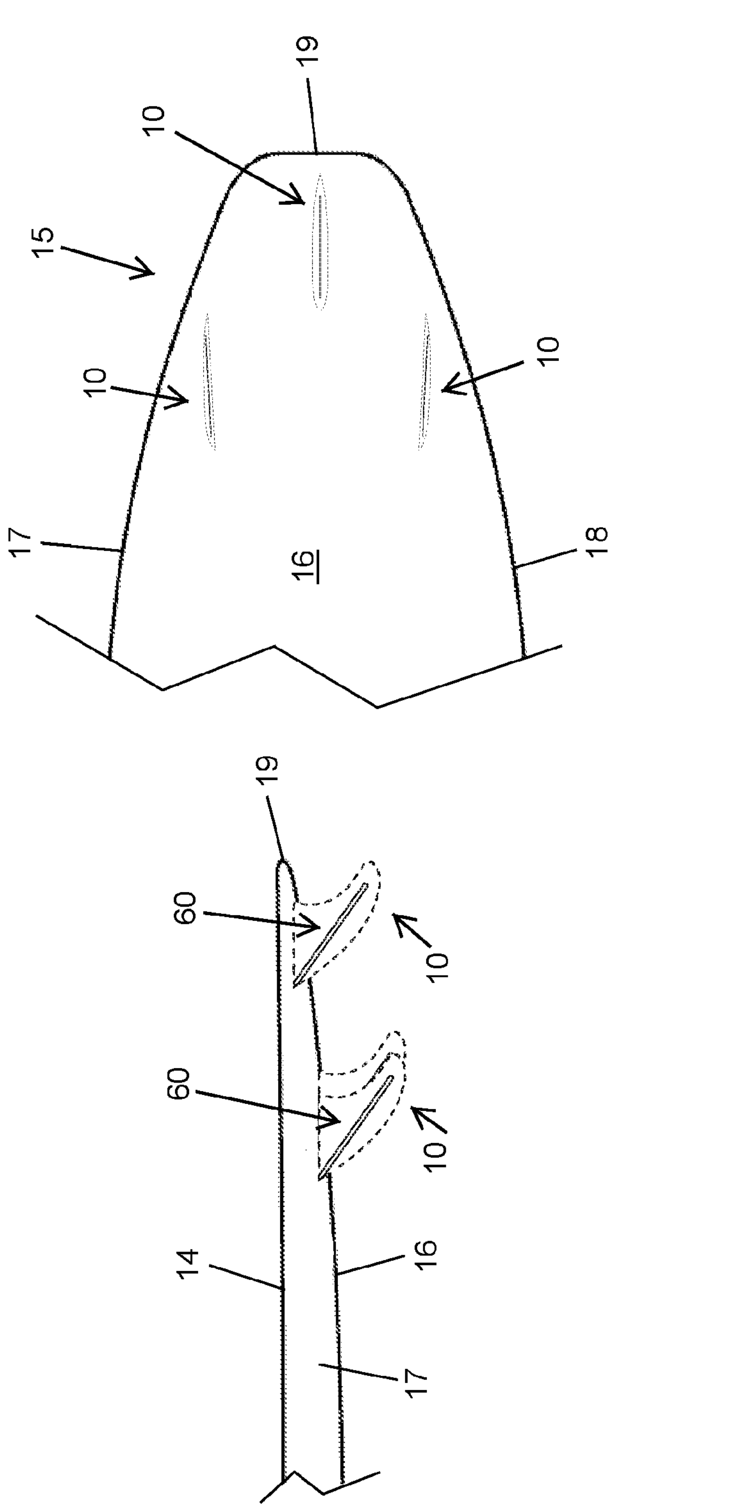
FIG. 4 illustrates a partial side and bottom views of a surfboard with a fin in accordance with an embodiment of the present invention.

FIGS. 1 and 3 illustrate an exemplary fin 10 according to the present invention which is shown generally by reference numeral 10 in the drawings. The fin 10 consists essentially of two basic components, a rigid plastic body element having a curved leading edge 21, and a curved trailing edge 22, and a flexible spine 40 is disposed within the side faces 20, 28 and located on a midline or centre line axis 50 running from the leading corner 26 to the fin tip 25. The fin 10 has an enlarged width base 23 with tabs 24 for securing the fin 10 within a socket located on a bottom surface 16 of a surfboard 15. Alternatively, the base 23 may have a single tab 24 for securing the fin 10 to the surfboard 15. While a mechanical means for attachment has been illustrated in the drawings the fin 10 may also be permanently bonded to the surfboard 15 as shown in FIG. 4.

The pair of side faces 20, 28 are slightly convex or foil shaped. Fin foil is the curve of the fin 10 from front to back and from tip to base. The foil and fin thickness determines how much and where on the fin that flex takes place when turning. Different foils give the fin 10 its different performance characteristics. While the shape of the fin 10 may vary, a particularly useful shape is that illustrated in the drawings, wherein the leading edge 21 curves back toward the trailing edge 22, and the edges 21, 22 intersect at a rounded tip 25 remote from the base 23. The leading edge 21 intersects the base 23 at a leading corner 26 and the trailing edge 22 intersects the base 23 at a trailing corner 27.

The fin 10 and the rigid plastic body may be made of a wide variety of materials, but it is highly desirable that the material be entirely compatible with fiberglass cloth, in particular if the fin is to be bonded directly to a surfboard 15.

Preferably, the fins 10 are manufactured from a fibreglass material or a fibreglass composite material which is bonded with a low viscosity thermosetting resin. The resin may be selected from the group consisting of a vinyl ester resin, an epoxy resin, a polyester resin, or any other plastics or polymer material. As a further alternative if the fin 10 is produced using an injection molding process a glass nylon resin may be used which can also include reinforcing materials such as carbon particles.

FIG. 4 illustrates an exemplary section of a surfboard 15 showing the fin 10 according to the present invention. The tail section of the surfboard 15 is shown with three fins 10 attached to the bottom side 16 and located inboard from the tail 19 of the surfboard 15. The deck or top side 14 and the rails 17, 18 are the sides of a surfboard 15 and have an enormous impact on the way it rides. The surface area of the fins 10 affects the way that the board 15 feels and how easy it is to control. Greater fin area provides more control and stability.

As illustrated in FIG. 4 the thruster setup is the most common and is found on all kinds of boards 15. In this configuration the fins 10 are positioned to perform well under most ocean conditions, lending a stable feel to a manoeuvrable board 15. The outside fins 10 are typically flat on the inside so the fin bites and manoeuvres and increase the drive, however the outside fins 10 can have a slight bevel or foil. The centre fin 10 is foiled normally (50/50 foil). Additionally, the outer fins 10 are toed-in to speed up the board 15 and allow it to turn more easily. Each fin 10 has a flexible spine 60 positioned to provide an optimised flex characteristic for the fin 10. While the surfboard 15 illustrated as an example has three fins 10 in a "thruster configuration, surfboards may also have one, two (twin fins), four (quad fins) or more fins in a variety of configurations.

Figure 2:
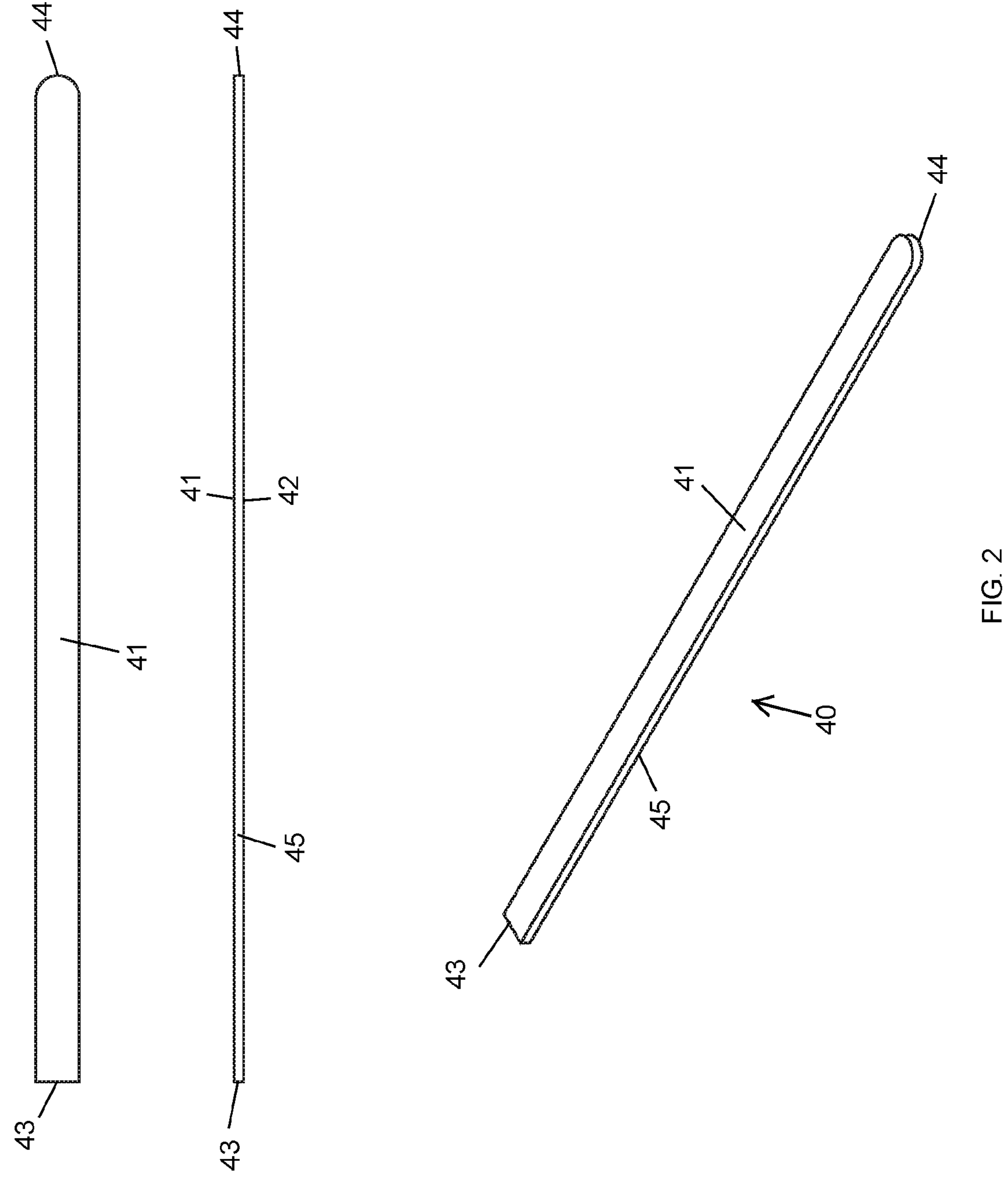
FIG. 2 shows views of the flexible spine as is embedded within the fin of FIG. 1.
Figure 10:
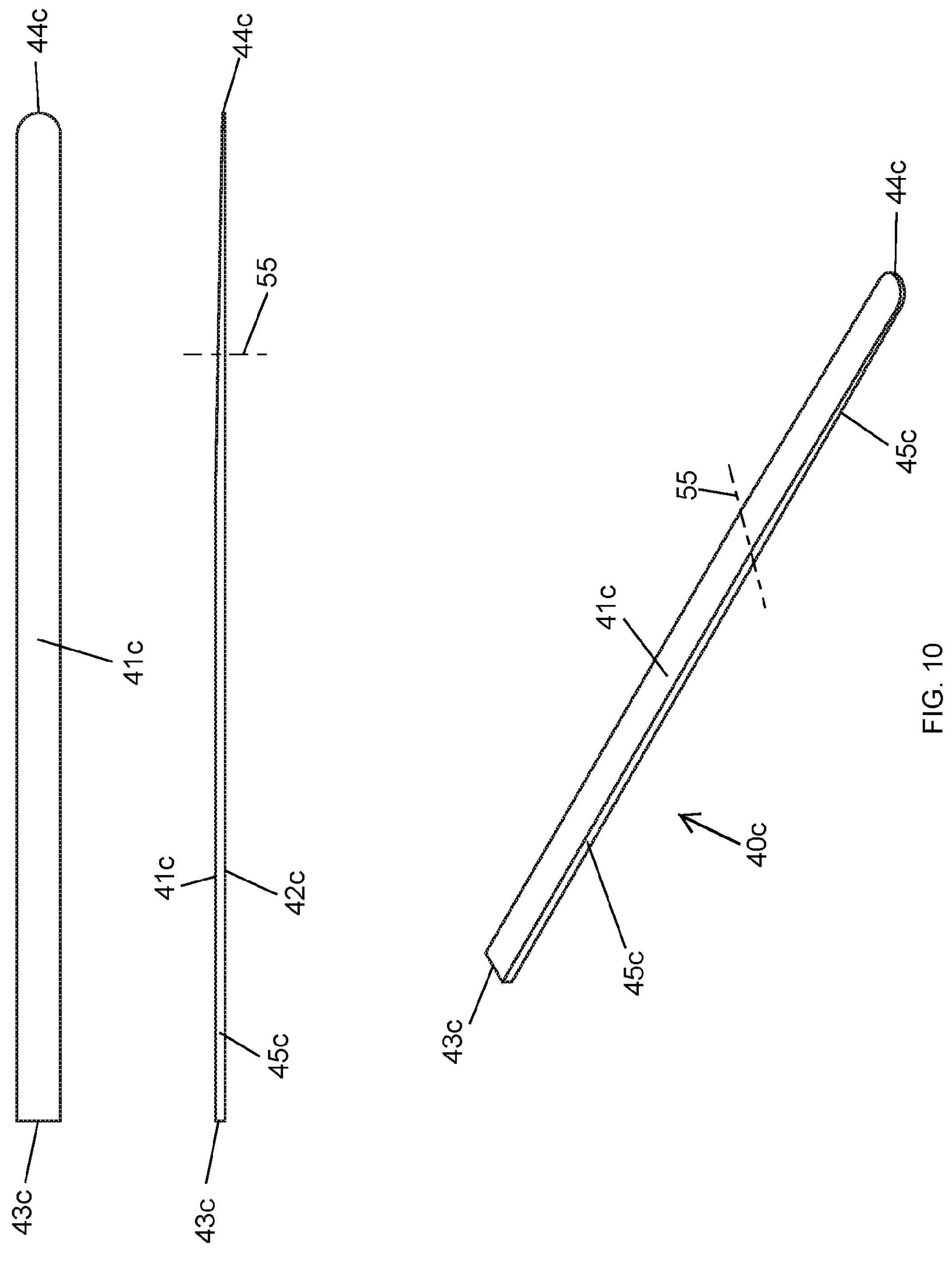
FIG. 10 shows views of a flexible spine which tapers along its length in accordance with an embodiment of the present invention.

As shown in FIG. 2, the flexible spine 40 has a substantially rectangular cross-section extending uniformly along the length of the flexible spine 40. However, given the varying requirements for different fins 10 including weight, shape, and size the flexible spine 40 can be supplied in a number of varied shapes, lengths, widths, thicknesses and can be formed in a variety of different cross-sectional shapes. Also, as illustrated in FIG. 10 the flexible spine 40*c* can be supplied in lengths of varying cross-sectional thickness. For example, the flexible spine 40*c* has a constant thickness extending approximately two-thirds of the length of the flexible spine 40*c* and then tapers axially towards the end 44*c*.

The flexible spine 40 has a substantially rectangular elongate body with a flat bottom side 42 with an opposite flat top side 41. The top 41 and bottom 42 sides extend between a first end 43 and a second end 44. The top, bottom and ends are separated by an edge 45 extending around the periphery of the flexible spine 40. Typically, the ends 43, 44 of the flexible spine 40 have a profile shape such as curved, rectangular or square shaped, however the ends could simply be angled or any other shape. Likewise, one end 44 may be curved and the opposing end 43 rectangular or vice versa. Also, the peripheral edge 45 may be formed with a radius or rounded edge 45 extending around all sides of the flexible spine 40 or alternatively only along the long side edges 45 extending between the first and second ends 43, 44 of the flexible spine 40. Alternatively, the peripheral edge 45 may be formed as a flat surface extending around all sides or alternatively, a flat surface along the long side edges 45 extending between the first and second ends 43, 44 of the flexible spine 40. In particular, when used in a fin 10 the ends 43, 44 can be shaped based on the location of the end 43, 44 within the fin 10. For example, the first and second ends 43, 44 of the flexible spine 40 are shaped to correspond substantially with the shape of the edge 21, 22, 23, corner 26, 27 or tip 25 to which they are located adjacent to within the fin 10.

In some embodiments, the design and shape of the flexible spine 40 and in particular, the peripheral walls 45 of the flexible spine 40 may be radiused to allow the flexible spine 40 when bent, to better distribute any stress over a broader area. In other words, there is more flexible elastic material to absorb the load. Structurally improved strength refers to relieving molded-in stress and the ability to absorb external stress. The flexible spine 40 has also been designed to better adhere to the side walls 20, 28 in the fin 10. The flat sides 41, 42 of the flexible spine 40 and the composition of fibres and resin within the spine 40 is designed to better bond the fin 10 and flexible spine 40. As described above, the radius peripheral edge 45 of the flexible spine 40 also provides more surface area for bonding plus alleviates pointed edges that can cause bonding issues, weak points and result in stress fractures within the adhesive/resin. Any resin build-up can cause stress fractures between the flexible spine 40 and the side walls 20, 28 which can cause damage to the fin 10 and reduce the elongated flex of the flexible spine 40 and the finish of the fin 10.

The flexible spine 40 can be manufactured using a continuous molding process to achieve a constant, uniform cross-section whereby the fibres are saturated with a liquid polymer resin and then formed and pulled through a heated die to form the flexible spine 40. The continuous molding process is a standard unidirectional pultrusion process where the fibres are impregnated with resin, possibly followed by a separate preforming system, and pulled through a heated stationary die where the resin undergoes polymerisation. The impregnation is either done by pulling the fibres through a bath or by injecting the resin into an injection chamber which typically is connected to the die. Many resin types may be used in pultrusion including polyester, polyurethane, vinylester and epoxy. Resin provides the resistance to the environment, (i.e., the corrosion resistance, the UV resistance, the impact resistance, etc.) and the glass provides strength for the flexible spine 40. The flexible spine 40 is a non-woven material which offers the elasticity and dampening required to provide the tensile strength, flexural modulas, recoil rate, elongate at break and compressive strength required for the fin 10. The non-woven molded unidirectional fibre reinforced flexible spine 40 produced by the continuous molding process has a composition of a plurality of straight fibres aligned linearly and a resin. The composition of fibres and resin form an elastically deformable spine 40.

In order to better understand the advantages of the present invention we must understand the importance of flex in a fin 10 for a surfboard 15. There are two main flex classifications that define a fins 10 performance: longitudinal (vertical or base to tip) and torsional (horizontal or leading edge to trailing edge). These flex characteristics determine the responsiveness or projection of the fin 10 and allow the fin 10 to be customised to suit a surfer's ability and surf conditions amongst others.

Longitudinal flex can be progressive or continuous. Progressive flex means that the flex in the centre of the fin 10, the tip 25 and the base 23 could all have different levels of flex governed by the positioning of the flexible spine 40. Fin flex is the amount of movement of a fin from side to side. The stiffer the fin 10, the less movement from side to side it will have, and thus the less flex. A more flexible fin 10 will reach maximum flex during a turn, reacting slower, leading to a lively/energetic feel but has less drive. A stiffer fin 10 takes longer and more force to reach maximum flex however responds with more force and has greater drive.

Torsional flex measures the stiffness of a fin 10 from its leading edge 21 to its trailing edge 22. Softer-flex fins make turning a board easier and are more responsive to rider input. A softer torsional flex fin will help a board manoeuvre, whereas a stiffer torsional flex fin will increase the board's ability to engage the rails 23, 24 and is more reactive and less forgiving and preferred for powerful surfing.

Basically, we have progressive flex which is the continuous flex pattern from the fins base 23 through to the fins tip 23 and this is generally how we characterise a fins flex. Typically, the fin flex is stiffer in the base 23 with a gradual increase in flex through to the fin tip 25.

For optimising performance, a balance of longitudinal and torsional flex needs to be considered and customised to the wants and needs of surfcraft designers, shapers, and surfers. Traditionally this area in surfcraft construction has received limited new research and development. The inventors strongly believe that controlled flex patterns are an integral part to the progression of surfcraft and surfing (rider experience). Therefore, governing how and when a fin 10 flexes which helps determine the feel of the board and how important factors such as speed and manoeuvrability can be controlled. It is important to also reinforce that the flexible spine 40 in a fin 10 improves the dynamic feel of the surfboard 15. It will flex to absorb force, distributing and storing energy and then respond back to its natural position. This response (or rate of return) provides a whip effect, creating acceleration and generating drive. The flexible spine 40 is designed to flex in unity with the surfer and the wave, for example the flexible spine 40 in the fin 10 contributes to projection, which in turn produces speed and control.

Figure 5:
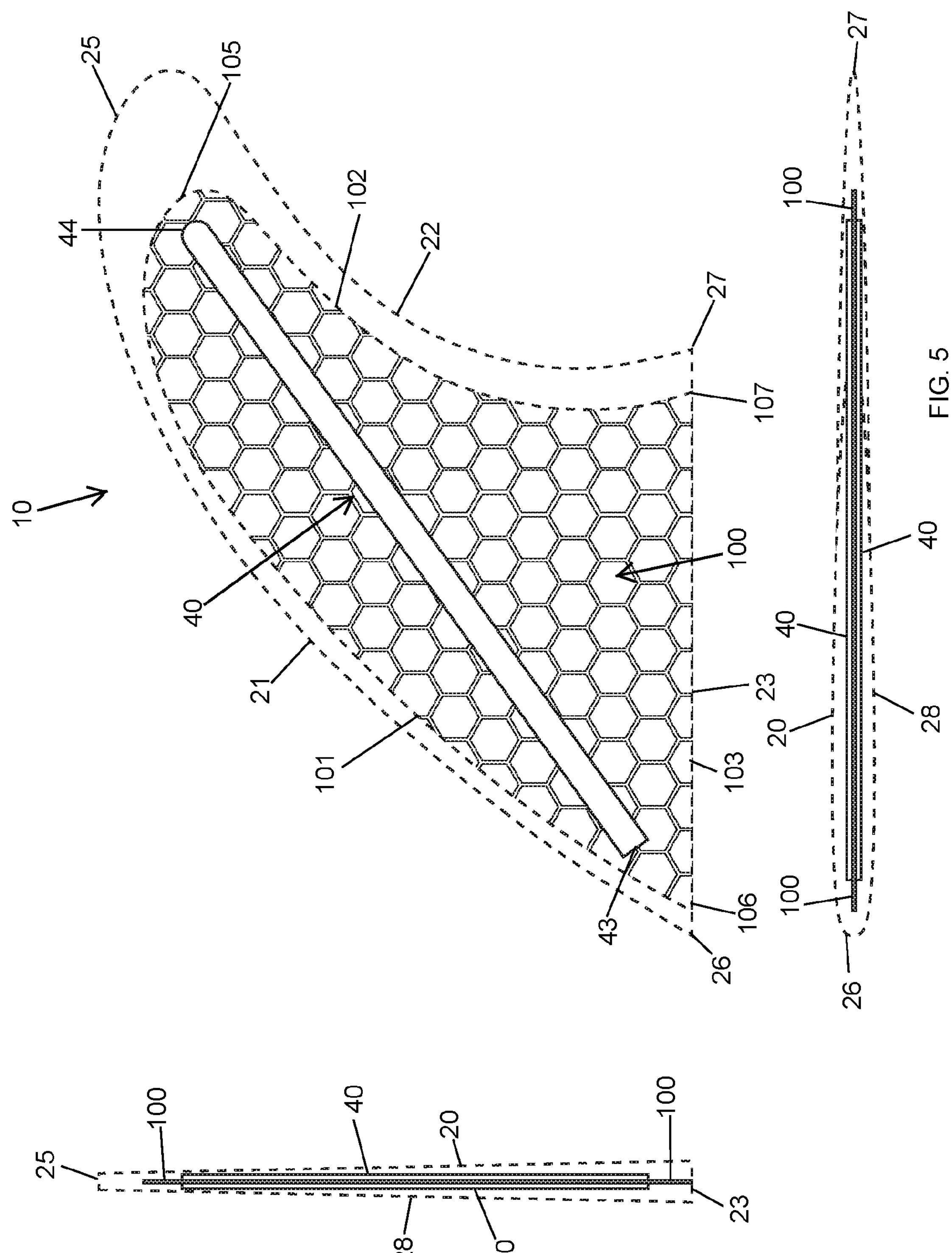
FIG. 5 illustrates front, side, and bottom views of a fin with a core and flexible spines located on each side of the core in accordance with an embodiment of the present invention.

FIG. 5 shows a further embodiment of an exemplary fin 10 according to the present invention with a fin core 100 located between a pair of flexible spines 40. The core 100 may be a solid core or a foam core. The foam cores 100 are constructed from PVC foam or polyurethane (PU) foam. The foam core 100 has air pockets located within the core 100 that may be partially or fully filled with resin during the manufacturing process. The solid cores 100 may be made of resin impregnated fibreglass, hardened resin, plastic, bamboo, or wood. As illustrated, the fin 10 has a polyurethane foam core 100 that mimics the geometric shape of the foil of the fin 10. The core 100 has a honeycomb or hexagonal shape which provides a very lightweight but extremely strong core 100. The core 100 has a base 103 extending along and adjacent to the fin base 23 with curved leading and trailing edges 101, 102. The leading edge 101 curves back toward the trailing edge 102, and the edges 101, 102 intersect at a rounded tip 105. The leading edge 101 intersects the base 103 at a leading corner 106 and the trailing edge 102 intersects the base 103 at a trailing corner 107. Located on opposite sides of the core 100 are the flexible spines 40. For clarity purposes, the fin tabs have been removed.

Figure 6:
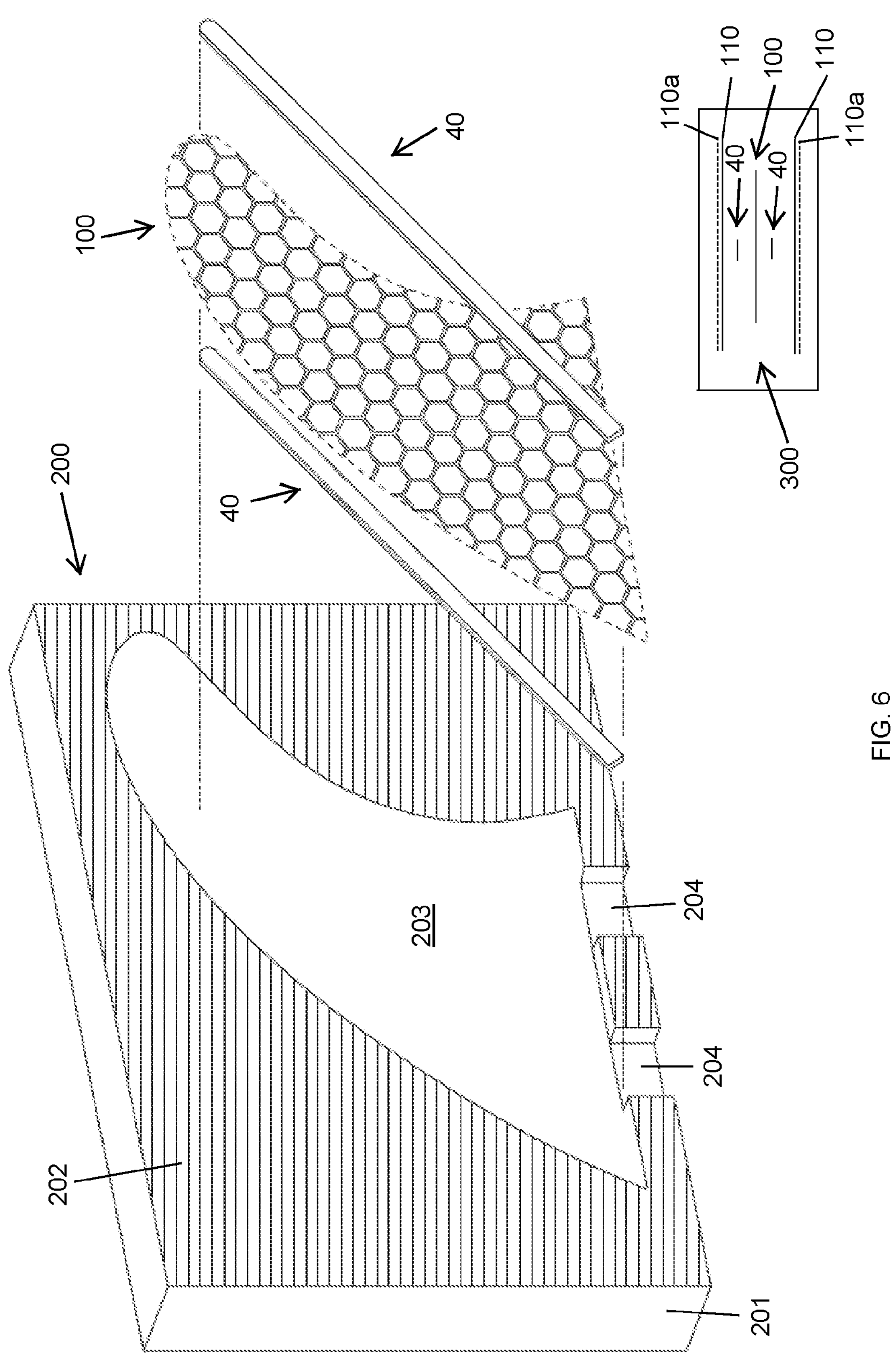
FIG. 6 illustrates the mold used in the molding process for producing the fin of FIG. 5.

FIGS. 6 to 9 illustrate exemplary fin manufacturing techniques which have been modified to include the flexible spine 40 within the fin 10 in accordance with the present invention. FIG. 6 shows a half fin mold 200 used to manufacture a fin 10 using the resin transfer molding or RTM process. This process involves injecting a liquid thermoset resin to saturate the fiberglass preform 300 within a mould that results in a plastic like fin 10. A mold consists of two primary components, the injection mold 200 and the ejector mold (not shown). Each mold is constructed from hardened steel, pre-hardened steel or aluminium. The moulds can be manufactured either by CNC machining or any other known method. The mold 200 has a body 201 and a mating face 202 into which the required shape of the fin 10 has been machined. As illustrated the geometric foil shape of one side of the fin 10 is machined into the mold mating face 202 as indicated by reference number 203. The tabs for mounting the fin 10 to a surfboard are also machined into the bottom edge of the mold face 202 as indicated by reference number 204. The quality of the mold is most critical to the RTM process. The surface finish and dimensional control of the mold determine the fin 10 produced from the RTM process. In other words, the time and money spent to make high quality molds will yield high quality fins 10.

A preform 300 comprising layers of fibreglass cloth 110, the core 100 and the flexible spines 40 are prepared. Two layers of fibreglass fabric 110 are illustrated in FIG. 6 on opposing sides of the preform 300. Many more layers of fibreglass fabric 110 may be present on either side of the core 100 depending on the particular fin type and shape of fin being designed/manufactured. An optional outer layer of black polyester veil 110A for each face of the fin 10 may be included to promote resin flow, as well as improve the external finish and appearance of the fin 10. The preform 300 is pre-cut prior to placement in the mold 200.

Prior to inserting the preform 300 into the mold 200 a release agent may be applied to each face of the mold 200 to facilitate the easy removal from the mold 200 and improve the surface finish of the solid composite fin 10. By way of example only, the release agent may be a gel coat such as a gel coat composed of a resin selected from the group consisting of a polyester based resin, an epoxy based resin, or a coloured resin. The release agent may also be a mold release wax.

The layered preform is then inserted into the mold 200 and the ejector mold is placed over the injection mold 200 enclosing the preform 300 within the mold 200. Optionally, the mold 200 can be heated to the resin injection temperature. Typically, the mold 200 will also have a nozzle for receiving the resin and also channels (not shown) in the mold faces to allow the resin to flow from the nozzle into the cavities 203 within the mold 200 to form the desired fin 10. Once the mold 200 is filled with resin a hydrostatic pressure is applied to fill any voids that have not been filled by the resin. The pressure is typically applied through the resin pumping system. The pressure ensures that any remaining porosity within the combined fibre-preform 300 and resin is collapsed. The resins that are conducive to the RTM process demonstrate low viscosity (ideally 500 cps or less), extended pot life, low volatile content, and low exothermic temperatures with a semi-rapid gel time. By way of example only the resins used in the production of the fins 10 are a vinyl ester resin, an epoxy resin, or a polyester resin. Other possible additives such as fillers and/or colour agents can also be injected into the mold to impregnate the preform 300 to form the fin body. The mold 200 is then left to until the fin 10 is set before placing the mold 200 into an oven and baking (a final cure) the fin 10 for a predetermined amount of time in order to gel and cure the fibreglass-preform 300 and resin to form a solid composite fin 10.

Once the gel time has expired the fin 10 is ready to be released from the mold 200. In use the mold 200 is usually designed so that the molded part or fin 10 reliably remains on the ejector side (not shown) of the mould when it opens and will typically then fall freely or be ejected from the ejector side. The fin 10 can then be finished by a light sanding. Finally, the fin 10 is finished by sanding, artwork can be added through spraying, screen printing or using water transfers and a final clear coat (matt, satin, or gloss) is applied.

Figure 7:
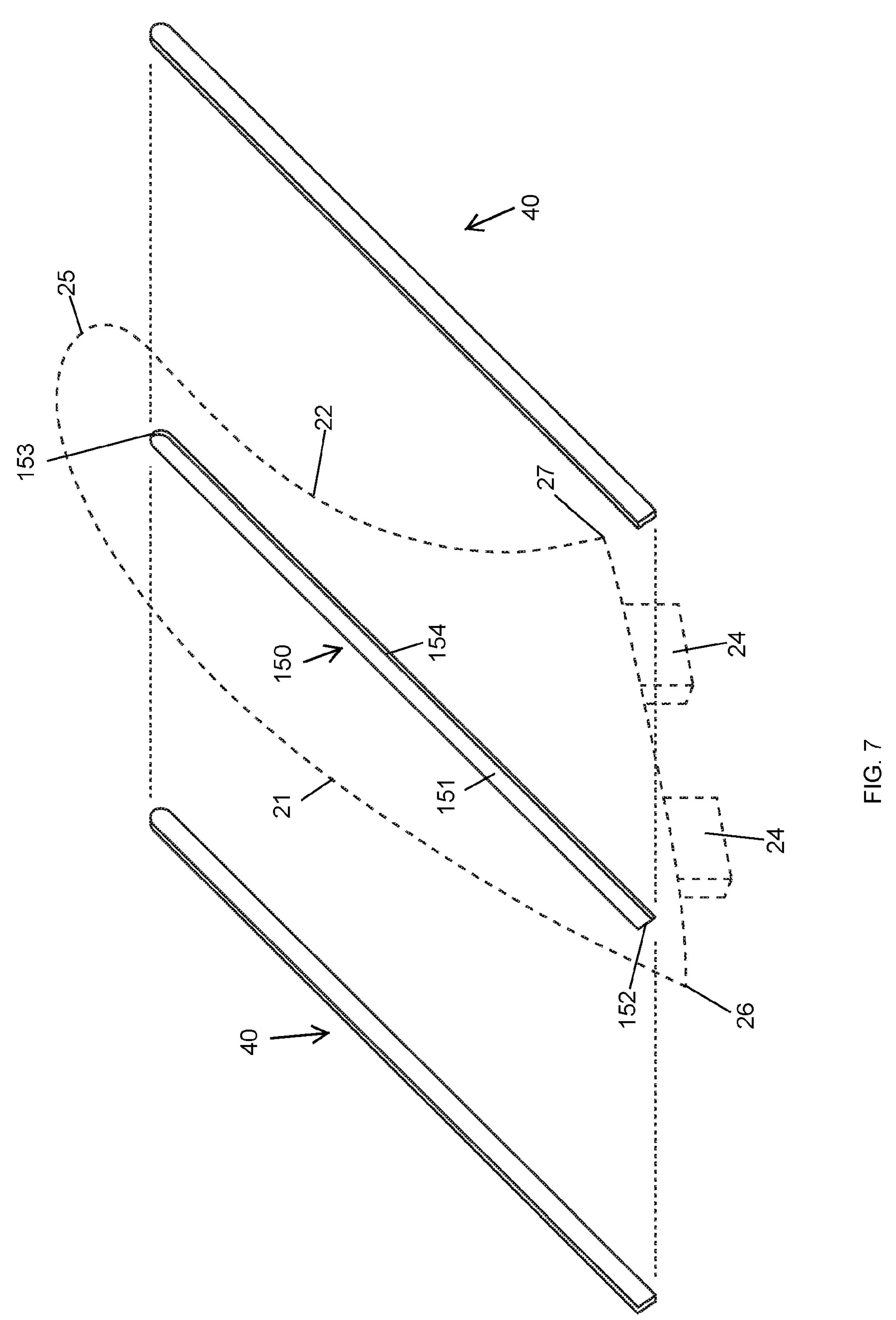
FIG. 7 shows a machined fin with a routed slot for receiving the flexible spine(s)
Figure 8:
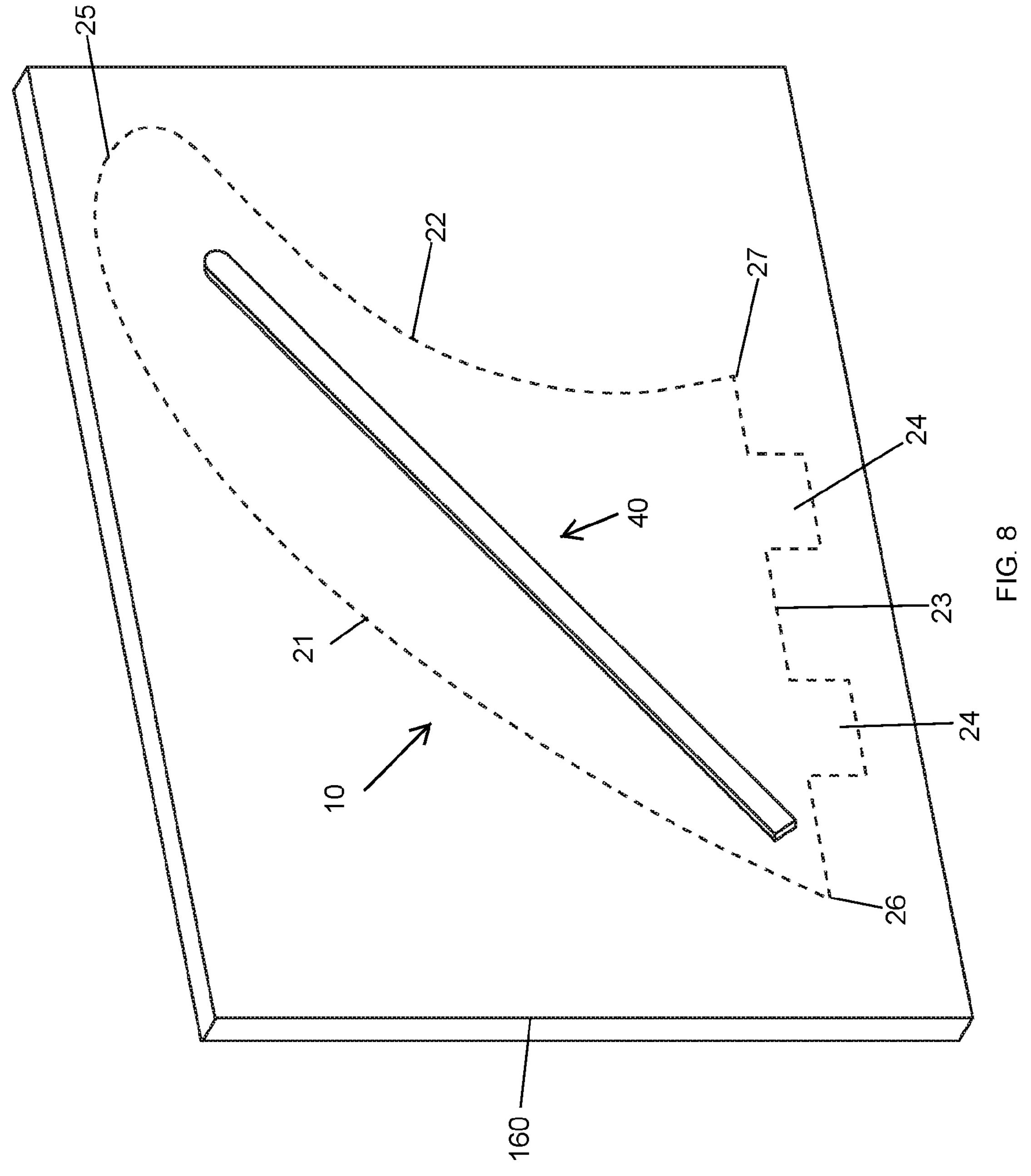
FIG. 8 illustrates a fibreglass panel with a flexible spine embedded within the panel with the outline of the fin prior to being machined.
Figure 9:
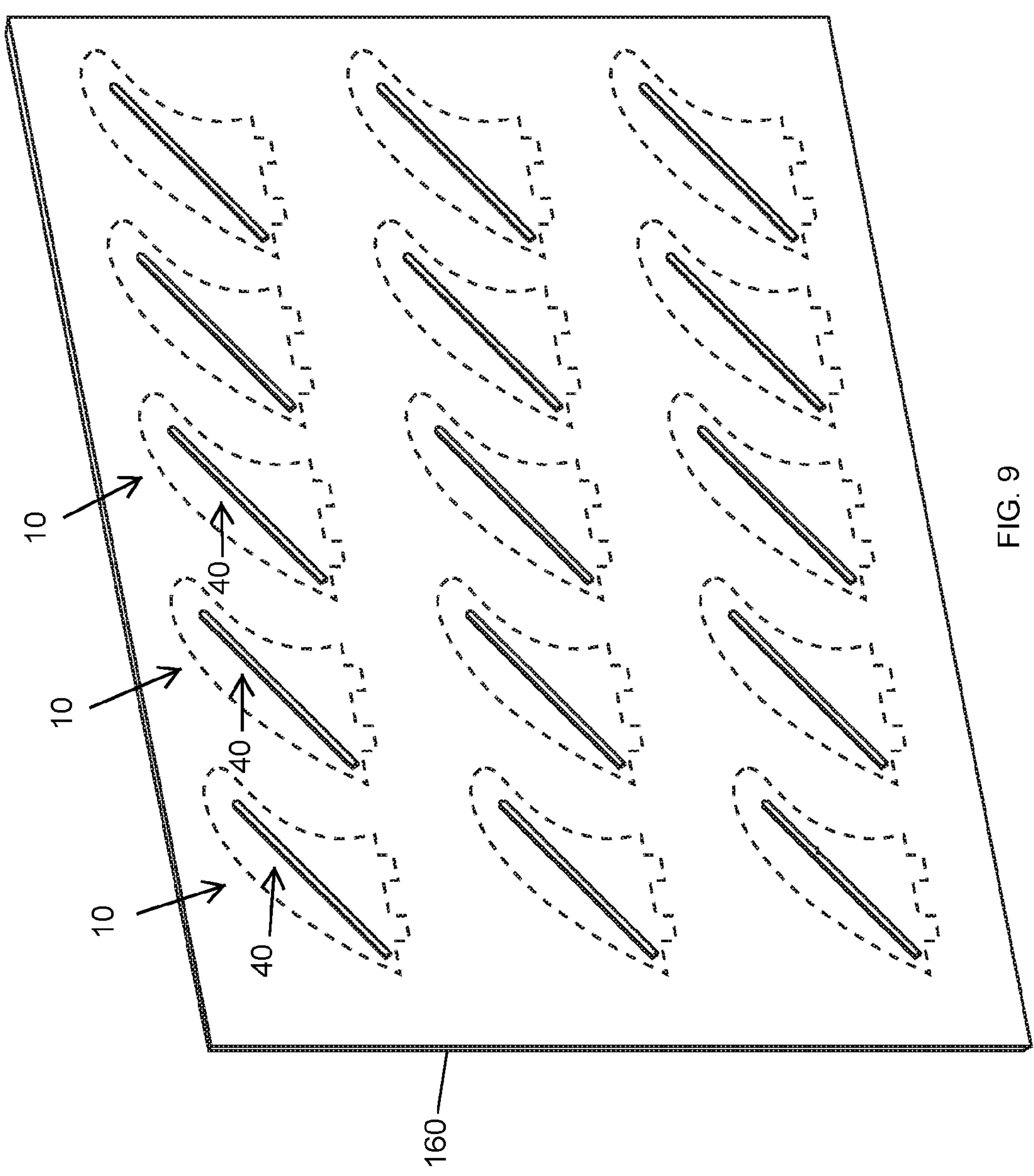
FIG. 9 illustrates a fibreglass panel with a plurality of embedded flexible spines, each spine is outlined by a fin prior to each fin being machines from the panel.

FIGS. 7 to 9 illustrate the further manufacturing process of machining the fin 10 from a sheet or piece of fibreglass 160. In this manufacturing process the flexible spine 40 can be inserted into the fin 10 using two different methods. As shown in FIGS. 8 and 9 the flexible spine 40 is molded into the fibreglass panel 160 and then the complete fin 10 including the flexible spine 40 is machined from the panel 160. Alternatively, the fin 10 can be machined from the fibreglass panel 160 and the flexible spine 40 inserted by routing a slot into one or more of the side faces 20, 28 of the fin 10 and inserting the flexible spine(s) 40 as illustrated in FIG. 7.

A longitudinally extending slot 150 having a shape which substantially corresponds to the shape of the flexible spine 40 is routed into the side faces 20, 28 of the fin 10. The longitudinal slot 150 has a first square end 152, a second curved end 153, a base 151 and a peripheral edge 154 extending around the perimeter of the slot 150. The depth of the slot 150 is such that it extends into the core of the fin 10 so that when the flexible spine 40 is inserted into the slot 150 the top surface of the flexible spine 40 sits flush or just below the face of the fin 10. Alternatively, the depth of the slot 150 is such that it extends into the core of the fin 10 so that when the flexible spine 40 is inserted into the slot 150 the flexible spine 40 sits between the first and second faces 20, 28 of the fin 10. The flexible spine 40 is then bonded to the fin 10 using a suitable bonding adhesive such as a resin. For example, the resin may be a polyester based resin, an epoxy based resin or a vinyl ester resin.

Typically, a mechanical router, electric hand router, hand plane or CNC machine is used to hollow out an area in the face of the fin 10 to accurately create the recessed area for installation of the flexible spine 40. In FIG. 7 the two flexible spines 40 are located along the midline axis of the fin 10. As was described above and further described below the placement of the flexible spine 40 is not limited to what has been described and illustrated. The flexible spine 40 can be placed in any number of positions on the faces of the fin 10 and likewise, multiple flexible spines 40 may be placed in one or more of the faces of the fin 10. The nature and design of the present invention allows the user or surfer to customise the flex pattern of their fin 10 through the placement of the flexible spine 40 in the fin 10. The placement of the flexible spine 40 can also increase the overall strength while providing the controlled desired flex pattern.

Alternatively, plastic injection molding is another exemplary fin manufacturing technique which can be modified to include the flexible spine 40 within the fin 10 in accordance with the present invention. Plastic injection molding is a manufacturing process for producing fins 10 by injecting molten plastic material into a mold. By way of example only, the fin 10 and the molten plastic material may be manufactured from a glass nylon mix, such as carbon. To accommodate the flexible spine 40 within the fin 10 a cavity is molded into the fin 10 as a part of the injection molding process. The cavity may extend into the body of the fin 10 from the base 23, or the cavity can be molded into each face 20, 28 of the fin 10. Once the fin 10 has been injection molded with the respective cavity, a flexible spine 40 is secured by an adhesive such as a resin or epoxy resin to secure the flexible spine 40 to the cavity of the fin 10.

FIG. 10 illustrates a further embodiment of the flexible spine and is indicated by the reference 40*c*. The flexible spine 40*c* is similar in overall shape and dimensions to that of the flexible spine 40. The flexible spine 40*c* has a top flat surface 41*c*, a bottom flat surface 42*c*, a first squared end 43*c* and a second rounded end 44*c*. The surfaces 41*c*, 42*c* and the ends 43*c*, 44*c* are largely separated by the peripheral edge 45*c* which extends around the flexible spine 40*c*. The main difference between the spine 40 and 40*c* is that the spine 40*c* tapers towards one end 44*c*. Approximately two thirds of the spine 40*c* has a constant cross section and the remaining cross section tapers from a point 55 to the end 44*c*. Alternatively, the spine 40 may taper over the length of the spine (not shown) from one end to another.

The foil of the fin 10 refers to the shape of the outside and inside faces 20, 28 of the fin 10. The foil is thinnest near the tip 25 of the fin 10, and thicker near the base 23. The shape of a typical fin 10 will therefore taper in thickness towards the fin tip 25. As such the flexible spine 40*c* can be utilised in order to minimise the thickness of the fin 10 towards the fin tip 25. The flexible spine 40*c* naturally follows the fins foil and thickness. The flexible spine can also be thinned simply to create its own progressive flex pattern. The positioning of the flexible spine within the fin will determine whether it needs to be tapered or not.

FIGS. 11 to 28 illustrate some of the different options and configurations available for the placement of flexible spines in fins.

Figure 11:
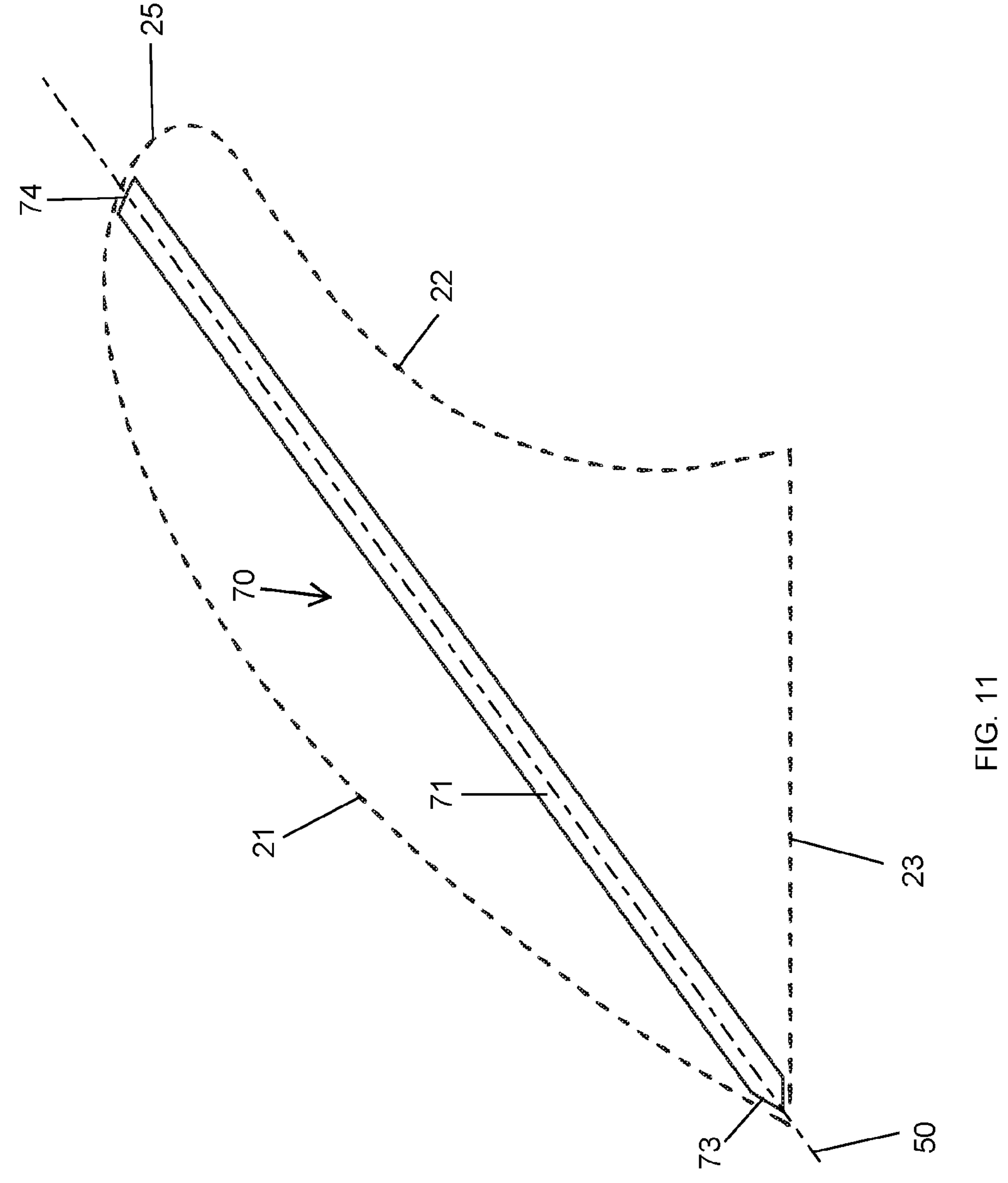
FIGS. 11 to 28 show various embodiments of fins with flexible spines located in positions within the fin to enhance the overall flex characteristic of the fin.

FIG. 11 shows a single flexible spine 70 which is disposed within the side faces and located on a midline or centre line axis 50 running from the leading corner to the fin tip 25. The flexible spine 70 is positioned symmetrically along the midline axis 50 with a top flat surface 71, a first end 73 and a second end 74. The first end 73 is shaped to correspond to the shape of the leading corner of the fin to which the first end 73 sits adjacent to. The second end 74 like the first end 73 is shaped to correspond with the surface to which it sits adjacent to. In this case the end 74 is curved to correspond to the shape of the fin tip 25.

Figures 12, 13:
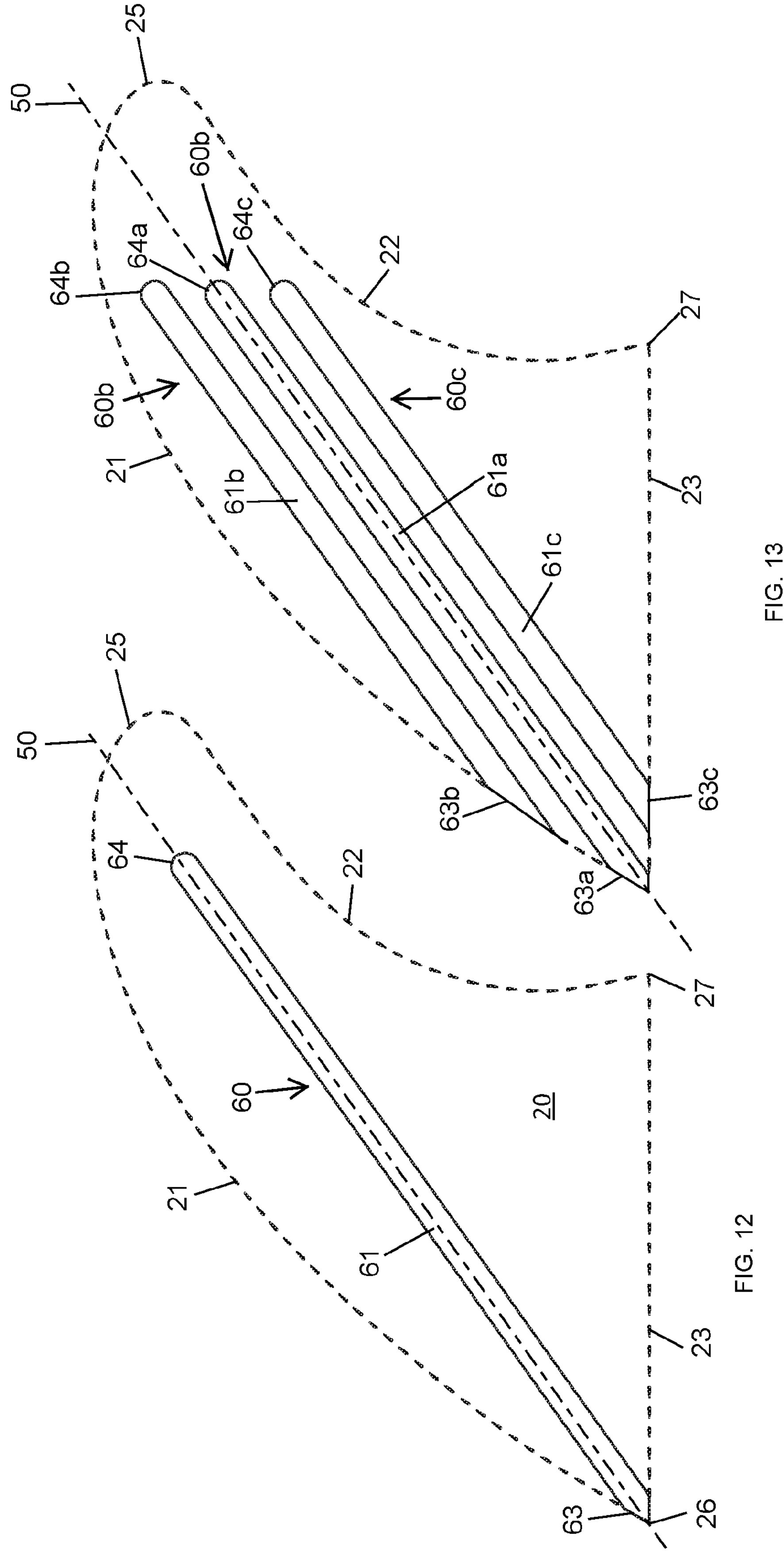

FIG. 12 illustrates a flexible spine 60 which extends along the midline axis 50 and has a top flat surface 61, a flat bottom surface (not shown), a first end 63 and a second end 64. The flexible spine 60 is shown located in the side face 20 of the fin 10, a second similar flexible spine 60 could also be located in the opposing face 28 of the fin 10. The first end 63 is shaped to correspond to the shape of the leading corner 26 of the fin to which the first end 63 sits adjacent to. The second end 64 is spaced apart a distance from the fin tip 25 and has a rounded shape.

FIG. 13 shows a further embodiment of the placement of the flexible spines in the fin 10. In this embodiment a first flexible spine 60*a* is placed in the same position as the spine shown in FIG. 12, a further two flexible spines 60*b* and 60*c* are positioned symmetrically on either side of the first flexible spine 60*a* and extending from positions adjacent the leading corner 26. The flexible spine 60*a* extends along the midline axis 50 and has a top flat surface 61*a*, a flat bottom surface (not shown), a first end 63*a* and a second end 64*a*. The flexible spine 60*b* extends parallel to and above the midline axis 50 and has a top flat surface 61*b*, a flat bottom surface (not shown), a first end 63*b* and a second end 64*b*. The first end 63*b* is positioned adjacent the leading edge 21 and is shaped to correspond to the curve of the leading edge 21. The second end 64*b* is rounded and positioned spaced apart a distance from the fin tip 25. The flexible spine 60*c* extends parallel to and below the midline axis 50 and has a top flat surface 61*c*, a flat bottom surface (not shown), a first end 63*c* and a second end 64*c*. The first end 63*c* is positioned adjacent the base 23 and is shaped to correspond to the flat edge of the base 23. The second end 64*c* is rounded and positioned spaced apart a distance from the fin tip 25.

Figures 14, 15:
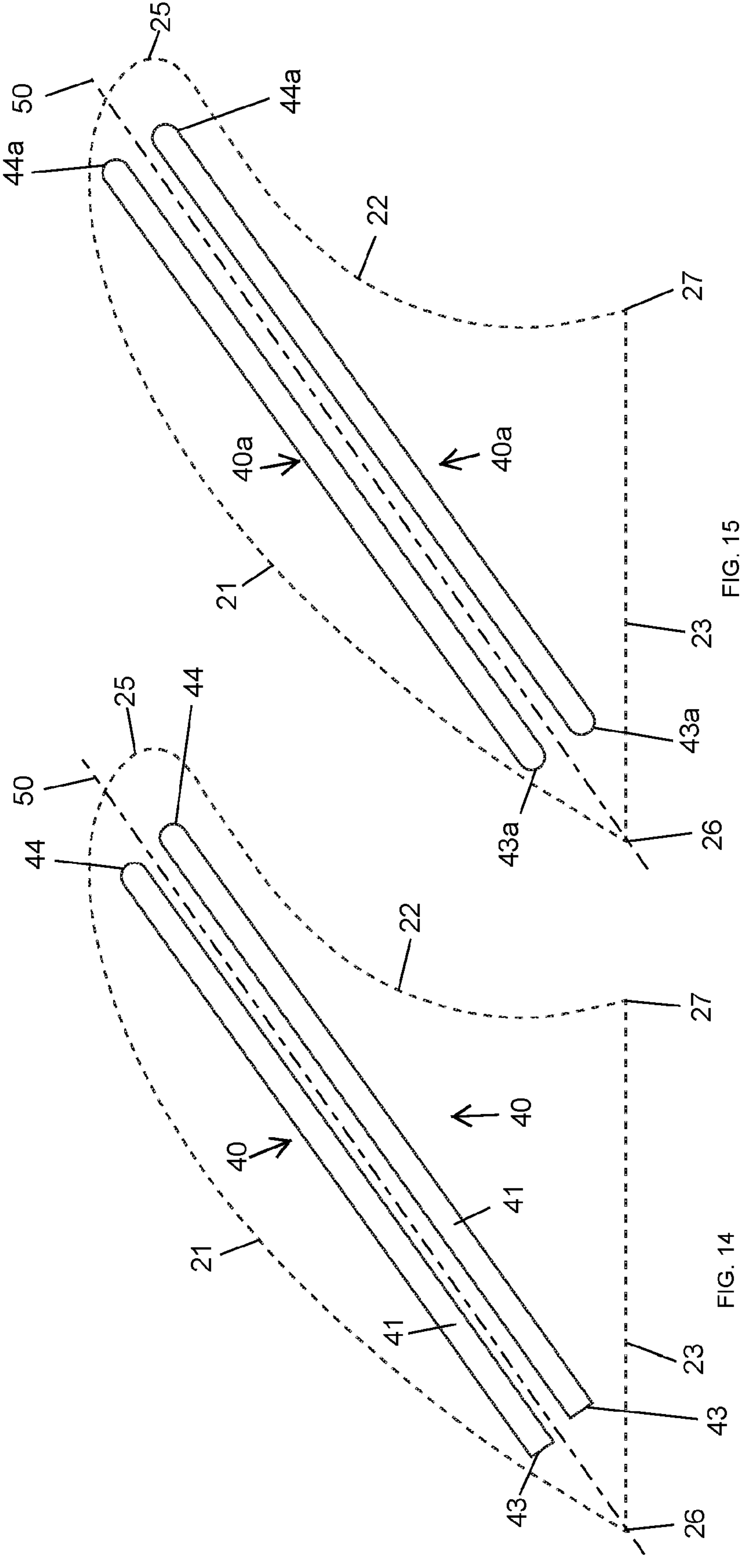

FIGS. 14 and 15 show two further embodiment of the placement of the flexible spines in the fin 10. In these embodiments two flexible spines 40, 40*a* are positioned symmetrically on either side of the mid-line axis 50 and extend substantially from the leading corner 26 to the fin tip 25. The spines 40, 40*a* run parallel with and are equally spaced on either side of the mid-line axis 50. The only difference between the embodiments shown in FIGS. 14 and 15 is the shape of the first ends 43, 43*a*. In FIG. 14, the first ends 43 are square and in FIG. 15 the first ends 43*a* are rounded.

Figures 16, 17:
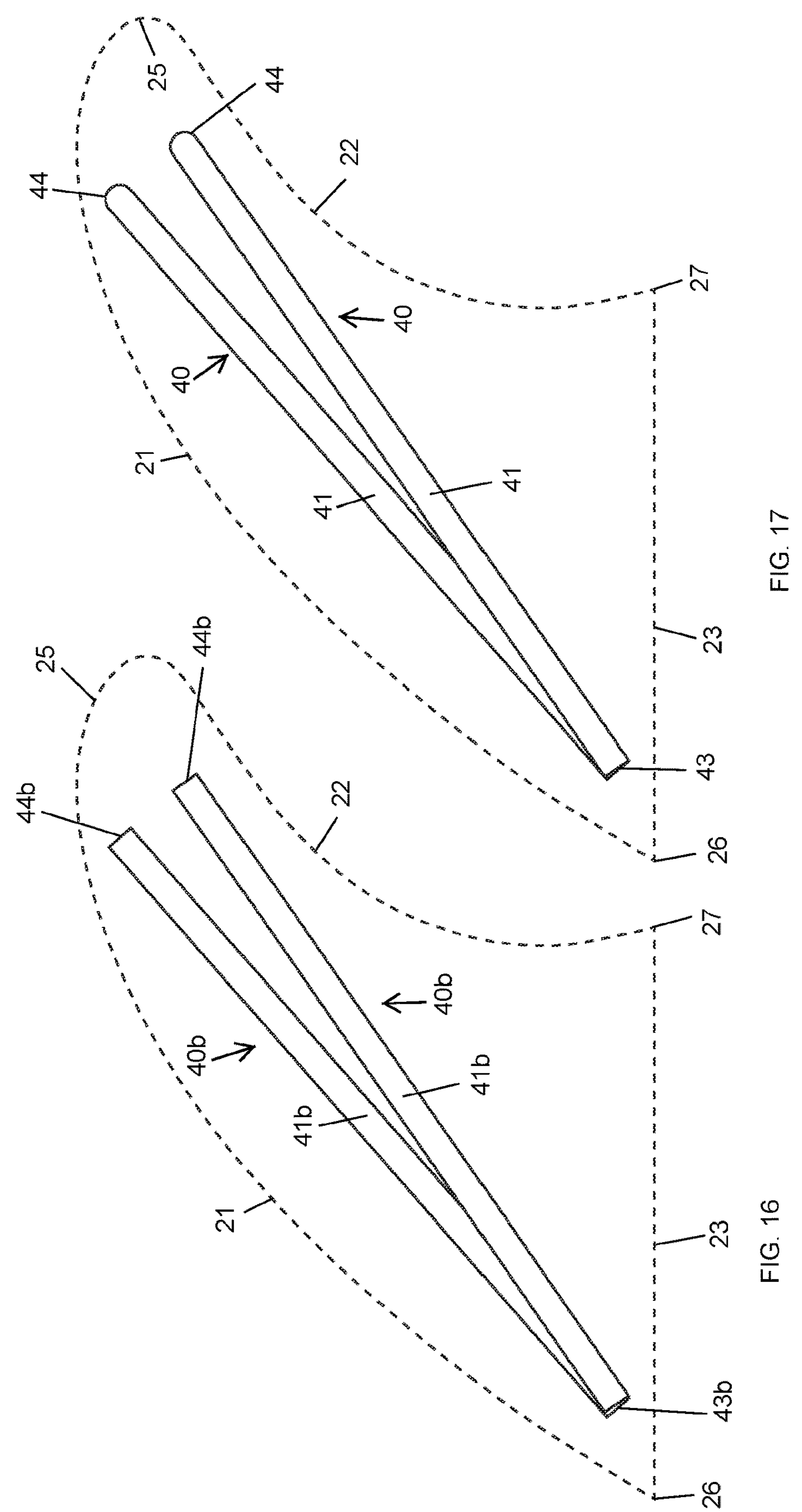

FIGS. 16 and 17 show two further embodiment of the placement of the flexible spines in the fin 10. In these embodiments two flexible spines 40, 40*b* are positioned extending from a common point adjacent the leading corner 26 and extending at an angle to form a V shape. The ends 43, 43*b* are positioned at a common point adjacent the leading corner 26 of the fin 10. The spines 40, 40*b* are angled apart to form the V-shape such that the ends 44, 44*b* extend towards the leading edge 21 and the trailing edge 22 of the fin 10. The only difference between the embodiments shown in FIGS. 16 and 17 is the shape of the second ends 44, 44*b*. In FIG. 16, the second ends 44*b* are square and in FIG. 17 the first ends 44 are rounded. If a midline axis was drawn between the two flexible spines 40, one flexible spine 40 would project from the common point and angled above the midline axis and the other flexible spine 40 would project from the common point and angled below the midline axis. Likewise, the flexible spines 40*b* are positioned similarly.

Figure 18:
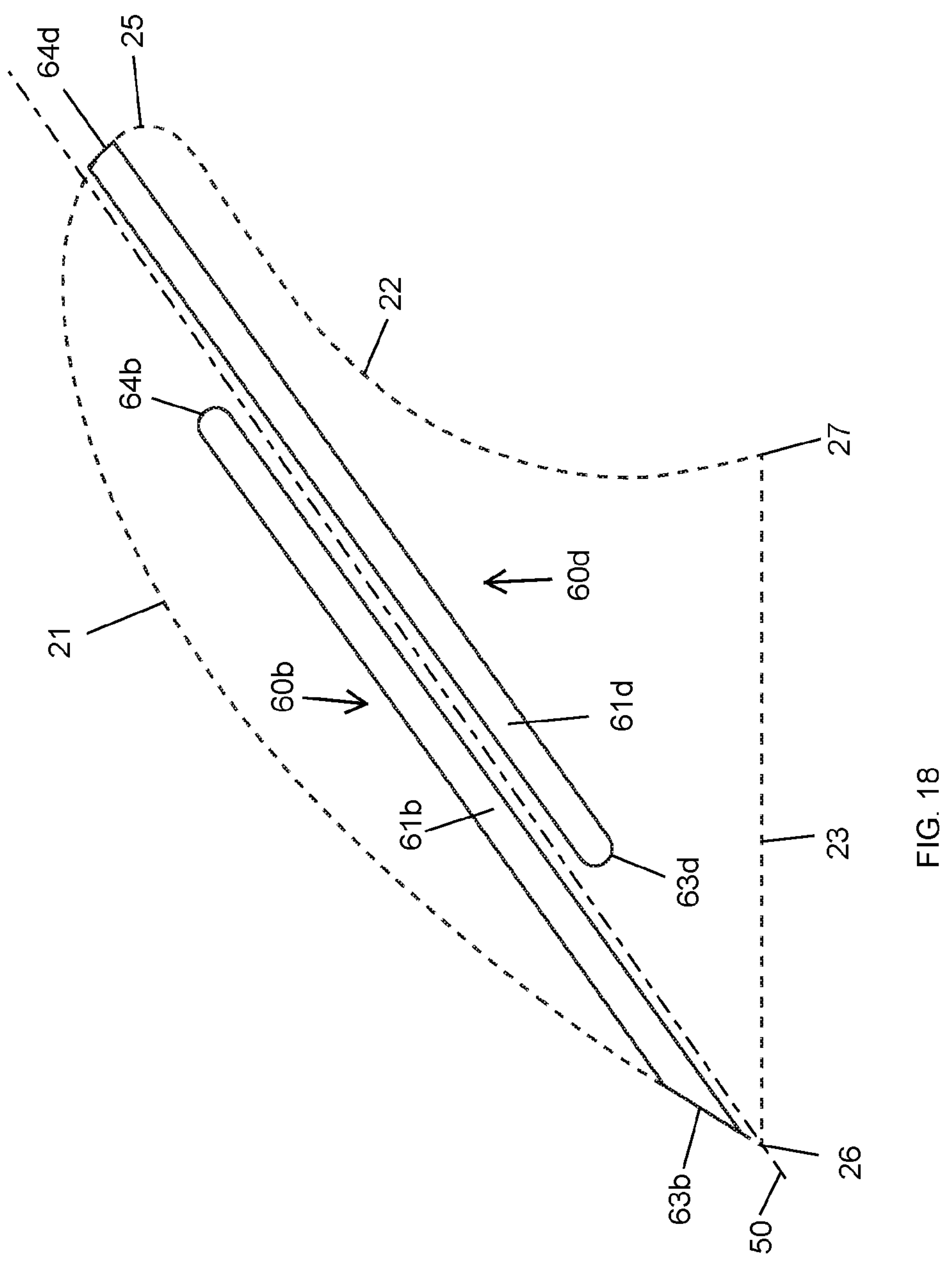

FIG. 18 shows a further embodiment of the placement of the flexible spines in the fin 10. In this embodiment two flexible spines 60*b*, 60*d* are positioned symmetrically and running parallel on either side of the mid-line axis 50. The flexible spine 60*b* extending from adjacent the leading corner 26 to a position spaced apart from the fin tip 25 and the flexible spine 60*d* extending from adjacent the fin tip 25 to a position spaced apart from the leading corner 26. The first end 63*b* of the flexible spine 60*b* is shaped to correspond to the curve of the leading edge 21 to which it sits adjacent to. Likewise, the second end 64*d* of the flexible spine 60*d* is shaped to correspond to the curve of the fin tip 25 to which it sits adjacent to. The ends 64*b* and 63*d* are both rounded. The distance which each end 64*b* and 63*d* are spaced from the corresponding leading corner 26 and the fin tip 25 is substantially equal in length.

Figure 19:
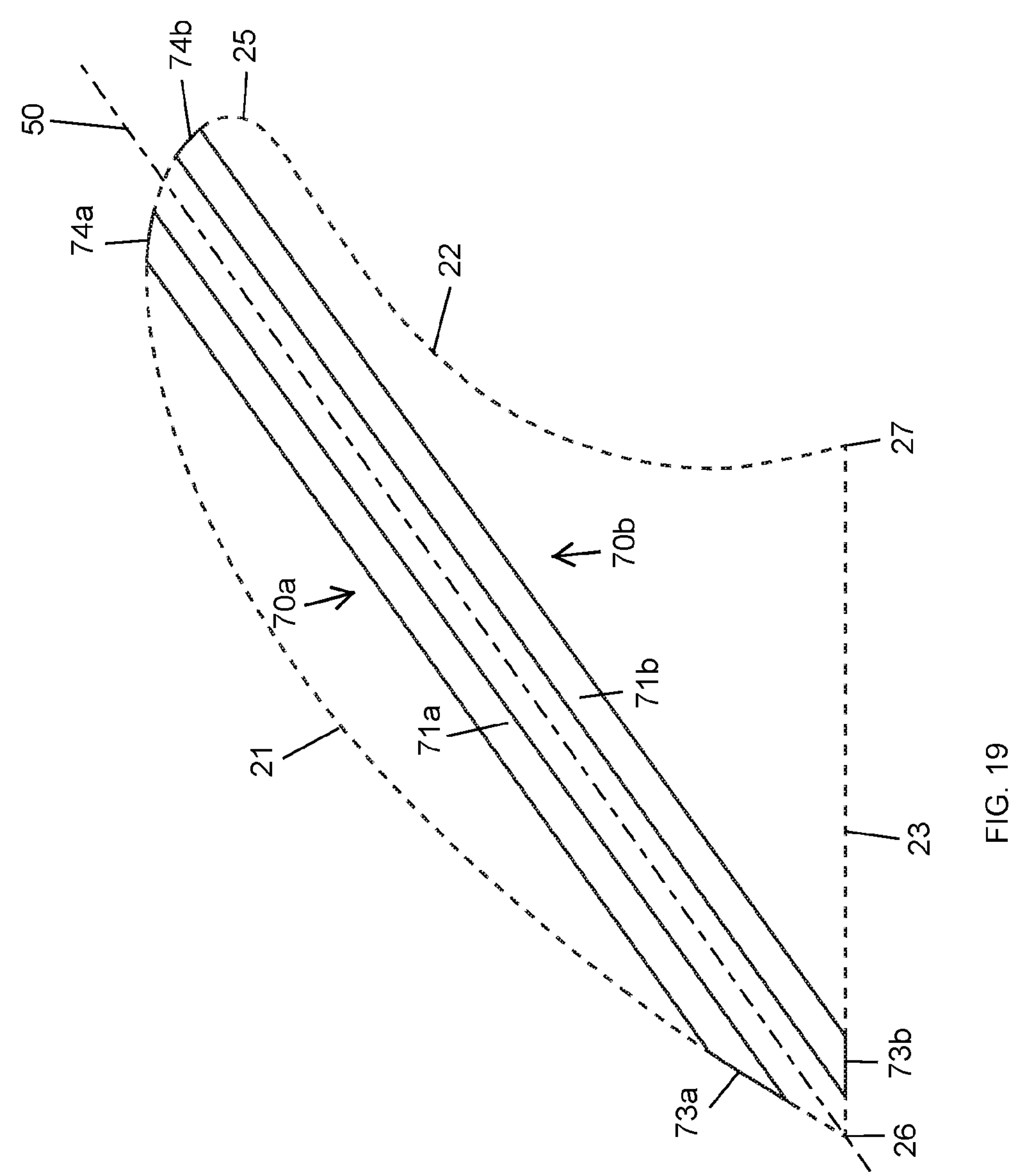

FIG. 19 shows a further embodiment of the placement of the flexible spines in the fin 10. In this embodiment two flexible spines 70*a*, 70*b* are positioned symmetrically and running parallel on either side of the mid-line axis 50. The flexible spine 70*a* having a first end 73*a* extending from adjacent the leading corner 26 and shaped along the leading edge 21 to a second end 74*a* position on the fin tip 25 and curved to correspond to the shape of the fin tip 25 to which it is located adjacent to. The flexible spine 70*b* having a first end 73*b* extending from adjacent the leading corner 26 and shaped along the base 23 to a second end 74*b* position on the fin tip 25 and curved to correspond to the shape of the fin tip 25 to which it is located adjacent to. Each spine 70*a*, 70*b* is equidistantly spaced from the mid-line axis 50.

Figure 20:
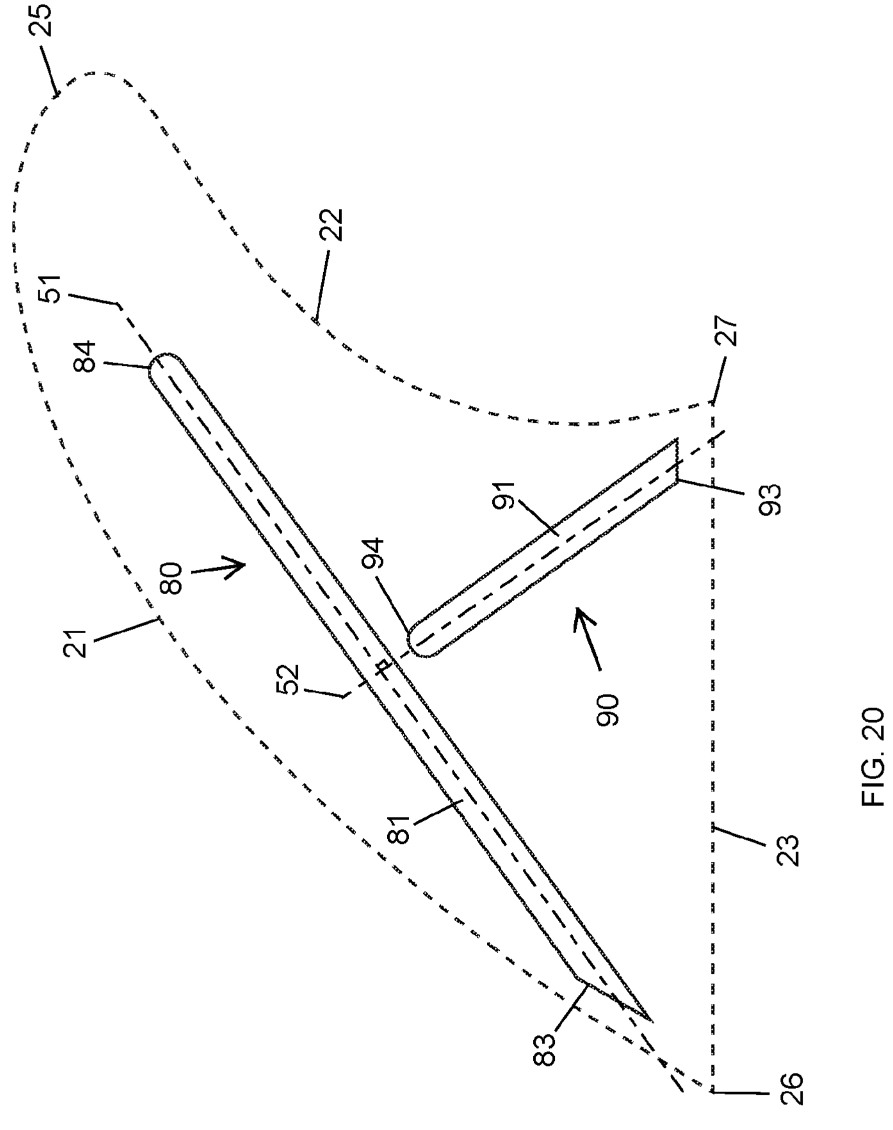
Figures 21, 22:
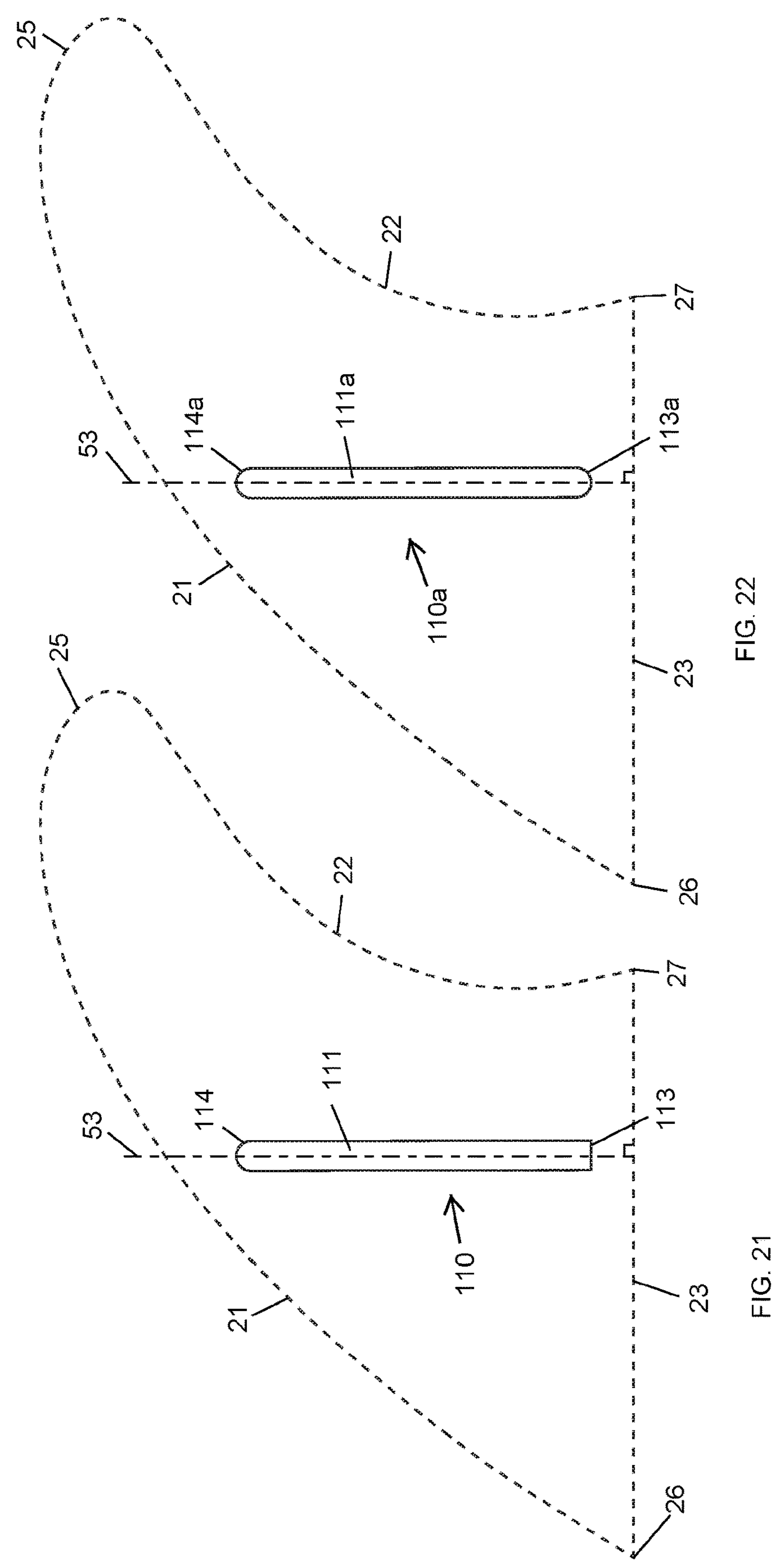

FIG. 20 illustrates a further embodiment in which two flexible spines 80, 90 are inserted into the fin 10, with the second spine 90 positioned to extend perpendicular from the first spine 80. The first flexible spine 80 has a first end 83 positioned adjacent to the leading corner 26, a flat top side 81 and a flat bottom side (not shown). The first end 83 is shaped to correspond to the shape of the leading edge 21 and spaced a short distance from the leading edge 21. The spine 80 extends to a second end 84 spaced from the fin tip 25 and running parallel to a line 51 passing longitudinally through the flexible spine 80. The second flexible spine 90 has a first end 93 positioned adjacent and spaced from the trailing corner 27, a flat top side 91 and a flat bottom side (not shown). The first end 93 is shaped to correspond to the shape of the base 23 to which it is located adjacent to. The second end 94 is located adjacent to the first flexible spine 80 and has a rounded end shape. A line 52 passing longitudinally through the second flexible spine 90 is positioned perpendicular with respect to the line 51 running through the first flexible spine 80, which locates the second flexible spine 90 perpendicular to the first flexible spine 80 in the fin 10.

FIGS. 21 to 24 show further embodiments of the present invention in which flexible spines 110, 110*a* are positioned running perpendicular to the base 23 of the fin 10. The only difference between the flexible spines 110, 110*a* as illustrated in FIGS. 21 to 24 is the first ends 113, 113*a*. The first end 113 is a squared shape at the bottom and the first end 113*a* has a rounded shaped bottom. Both flexible spines 110, 110*a* extend longitudinally along the lines 53 and perpendicular to the base 23. The first ends 113, 113*a* are positioned spaced from the base 23 and the second ends 114, 114*a* are positioned spaced from the leading edge 21. Both spines 110, 110*a* have a flat top side 111, 111*a* and a flat bottom side (not shown).

Figures 23, 24:
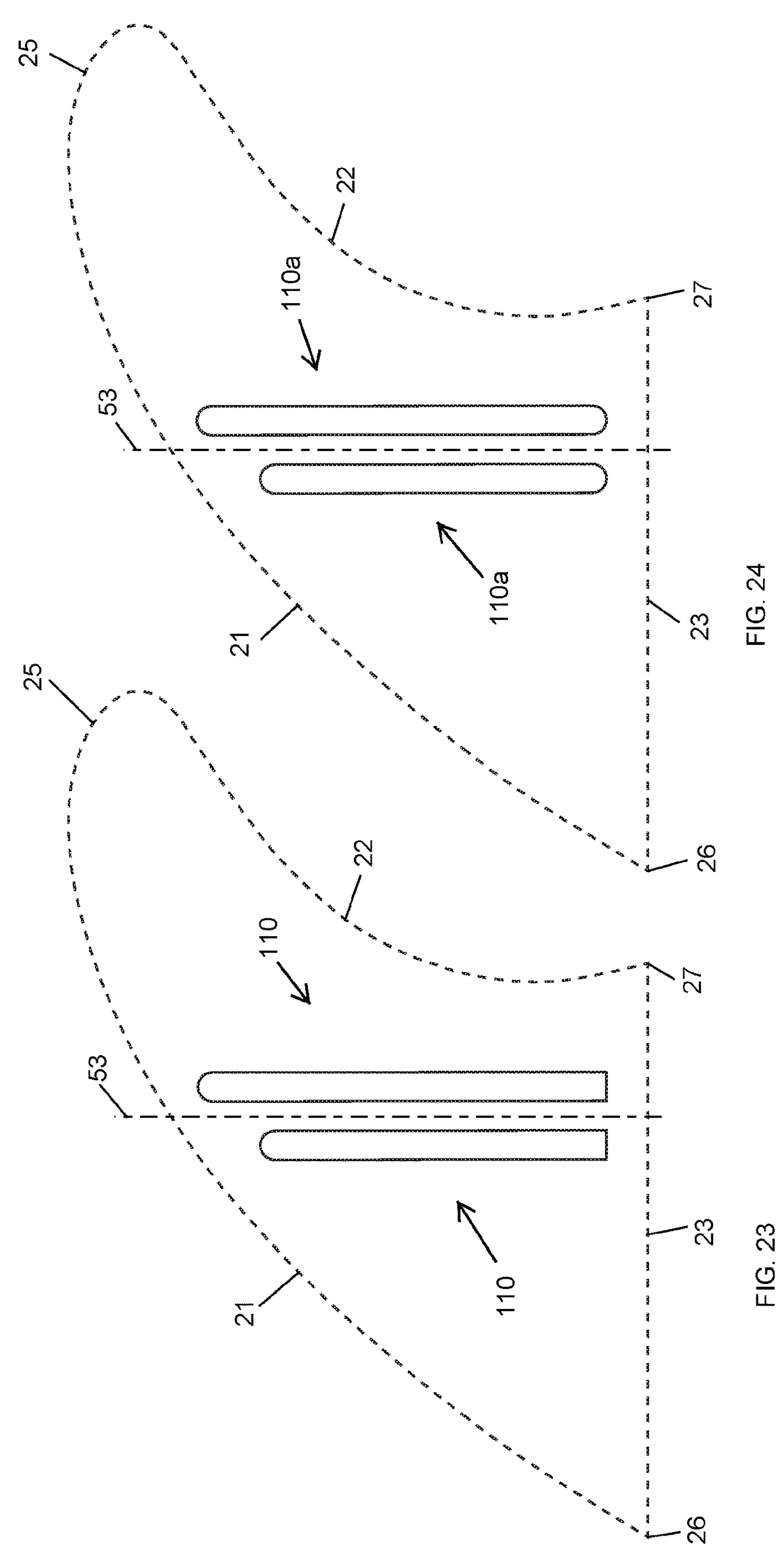

FIGS. 23 and 24 show a further embodiment in which two flexible spines 110 or 110*a* are located running perpendicular to the base 23 and spaced symmetrically each side of the line 53. As previously described above the line 53 runs perpendicular to the base 23 of the fin 10 and each spine 110, 110*a* is spaced equally each side of and running parallel with the line 53. Due to their position running along the leading edge 21, one of the two flexible spines 110, 110*a* is of a slightly longer length with the second ends spaced closer to the leading edge 21.

Figures 25, 26:
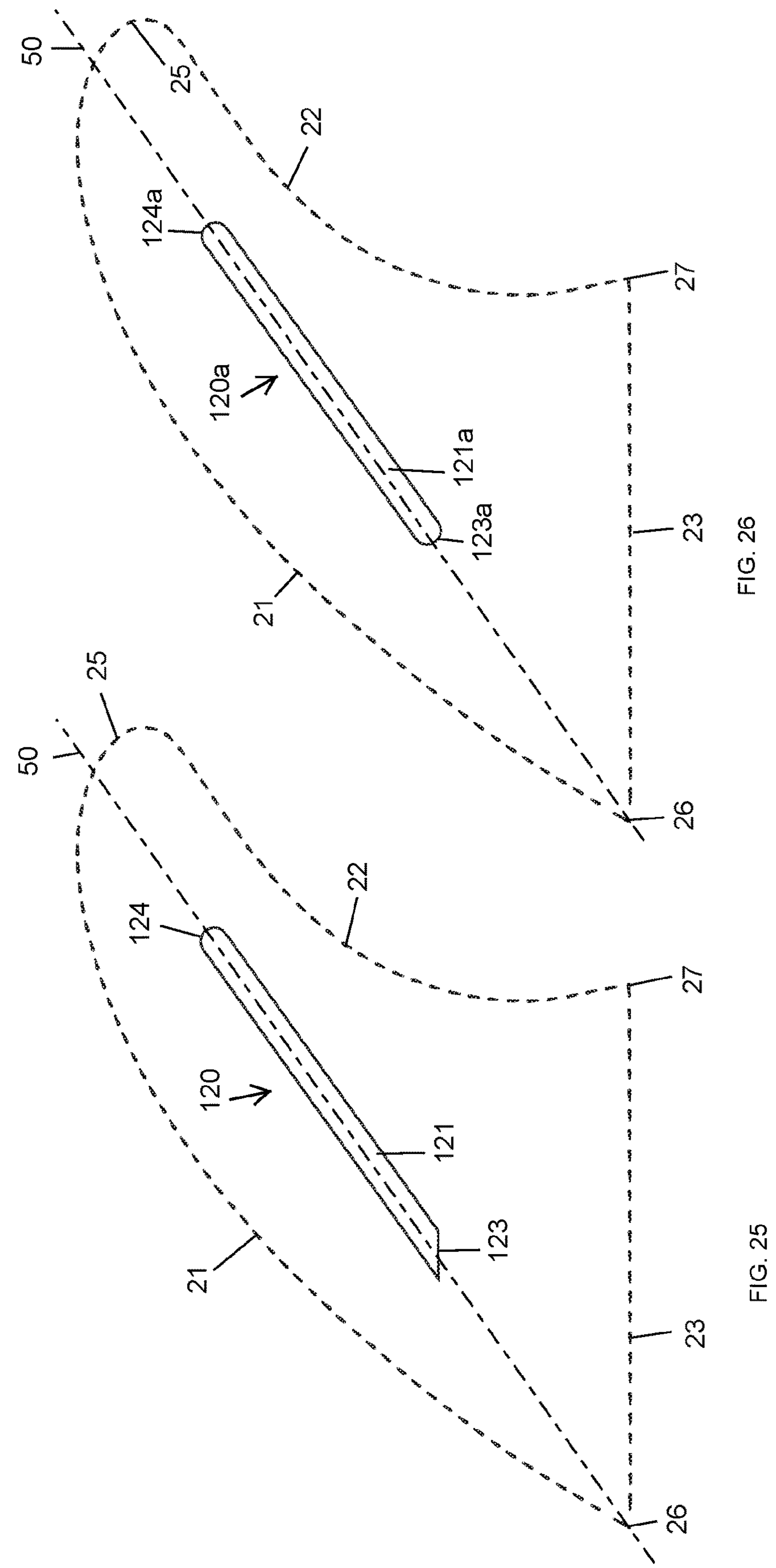

FIGS. 25 and 26, illustrates further embodiments of the present invention in which a shorter flexible spine 120, 120*a* is positioned running longitudinally along the mid-line axis 50 of the fin 10. The only difference between the flexible spines 120, 120*a* as illustrated in FIGS. 25 to 26 is the shape of the first ends 123, 123*a*. The first end 123 is a squared shape at the bottom and the first end 123*a* has a rounded shaped bottom. Both flexible spines 120, 120*a* extend longitudinally along the mid-line axis 50 extending from the leading corner 26 to the fin tip 25. The first ends 123, 123*a* are positioned spaced from the leading corner 26 and the second ends 124, 124*a* are positioned spaced from the fin tip 25. Both spines 120, 120*a* have a flat top side 121, 121*a* and a flat bottom side (not shown). In this embodiment the flexible spines 120, 120*a* are positioned approximately in the middle of the fin 10 and the ends are approximately evenly spaced from the leading corner 26 and the fin tip 25.

Figures 27, 28:
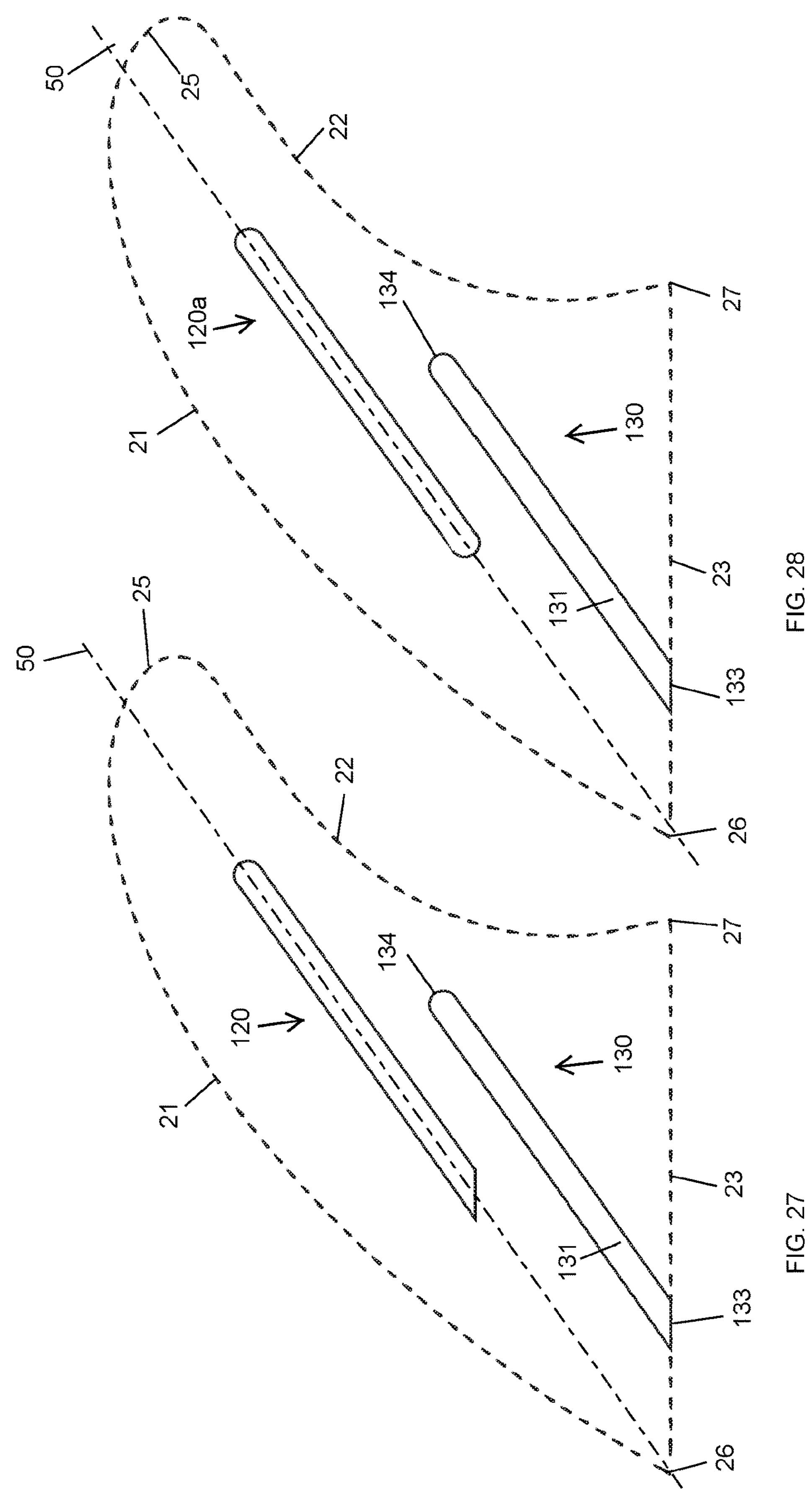

FIGS. 27 and 28 illustrate a still further embodiment of the present invention in which the spines 120, 120*a* are positioned as illustrated in FIGS. 25 and 26 and an additional spine 130 is placed in the fin 10 spaced from and running parallel to the flexible spines 120, 120*a*. The flexible spines 130 have a first end 133 located adjacent the base 23, a flat top side 131 and a flat bottom side (not shown). The first end 133 is shaped to correspond to the shape of the base 23 to which it sits adjacent to. The spine 130 extends to a second end 134 spaced from the trailing edge 22 and running parallel to the mid-line axis 50 passing longitudinally through the flexible spine 120, 120*a*. The second ends 134 have a rounded end shape.

Figure 29:
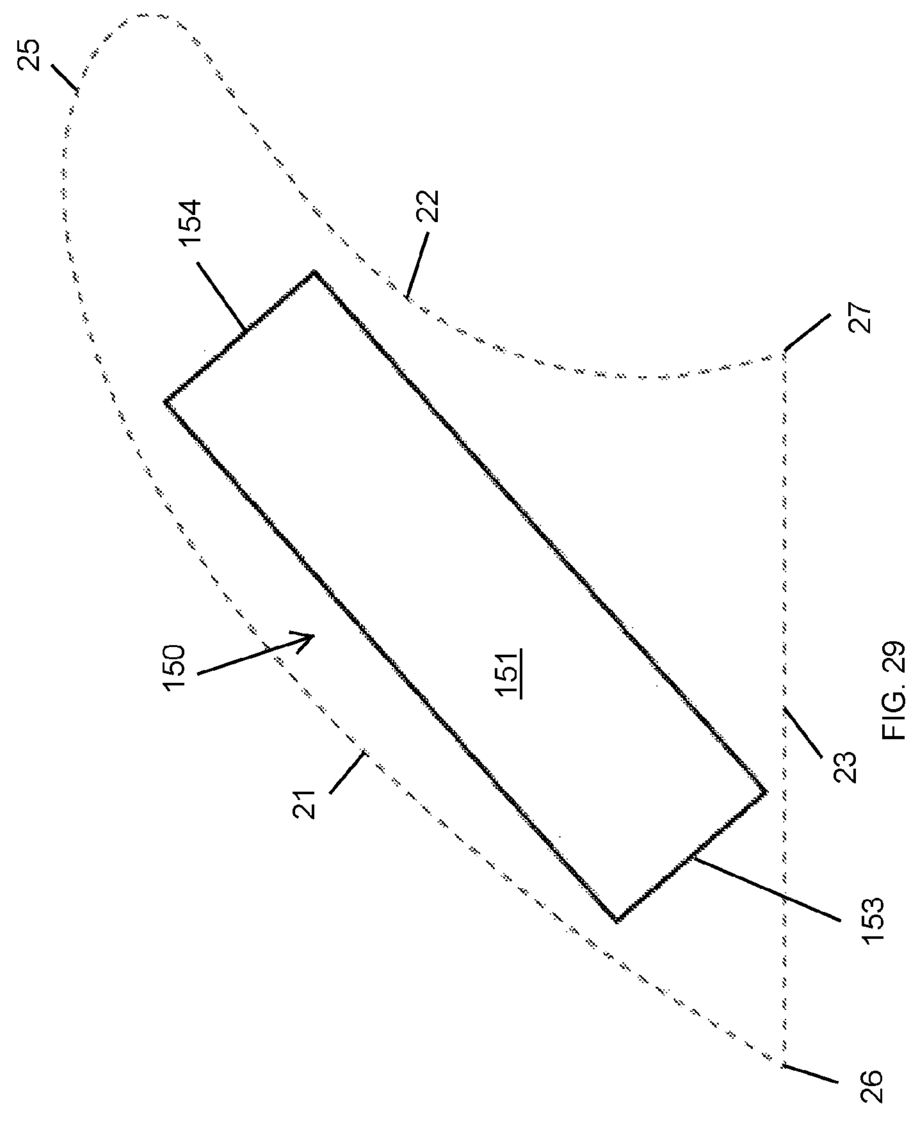
FIGS. 29 to 36 illustrate some further variations of the flexible spine located in positions within the fin to enhance the overall flex characteristic of the fin.
Figure 30:
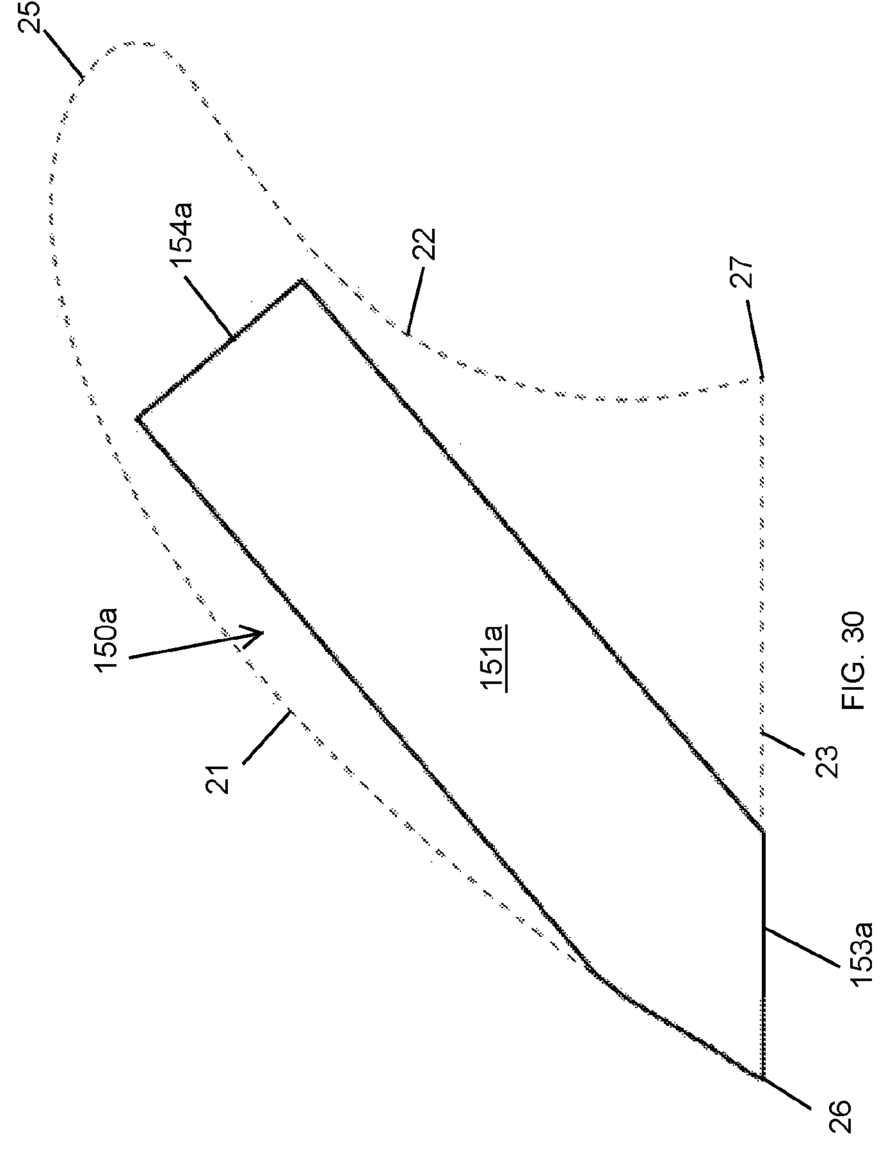

FIGS. 29 to 36 illustrate a still further embodiment of the present invention in which the spines 150, 150*a*, 160, 170, 180, 190, 200 and 210 are positioned as illustrated. FIG. 29 shows the flexible spine 150 with a first end 153 located adjacent the leading corner 26 and a second end 154 located adjacent but spaced from the fin tip 25. The flexible spine 150 has a flat top surface 151 and a flat bottom surface (not shown). Likewise, the flexible spine 1504*a* is shown in FIG. 30, the first end 153 *a* is located and shaped to correspond with the shape of the leading corner 26 and a second end 154*a* is located adjacent but spaced from the fin tip 25. The flexible spine 150*a* has a flat top surface 151*a* and a flat bottom surface (not shown).

Figure 31:
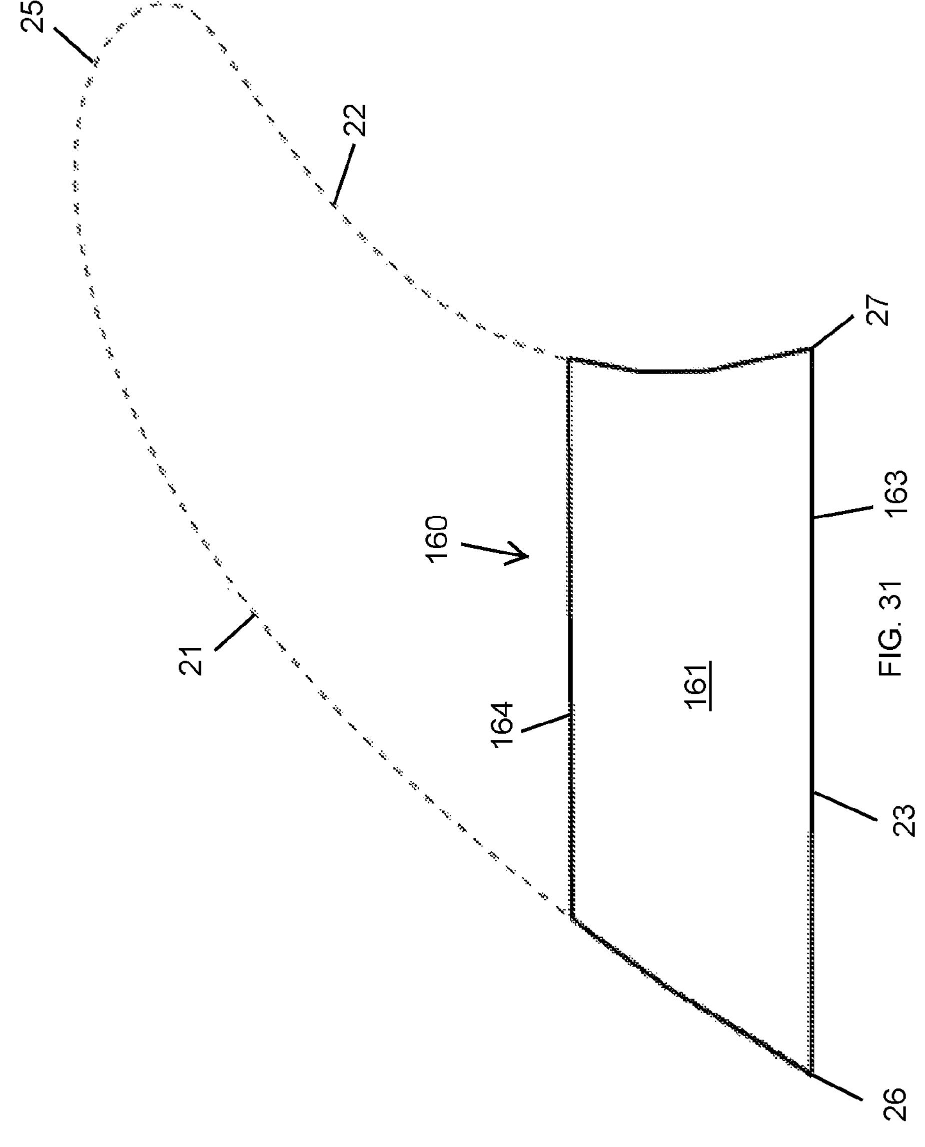

FIG. 31 shows the flexible spine 160 which is positioned adjacent to the base 23 of fin 20. The flexible spine 160 has a first end 163 located adjacent the base 23 and extending from the leading corner 26 to the trailing corner 27. The second end 164 runs parallel with the first end 163 and is located spaced from the base 23 and has a front corner positioned on the leading edge 21 and a rear corner located on the trailing edge 22. The flexible spine 160 has a flat top surface 161 and a flat bottom surface (not shown).

Figures 32, 33:
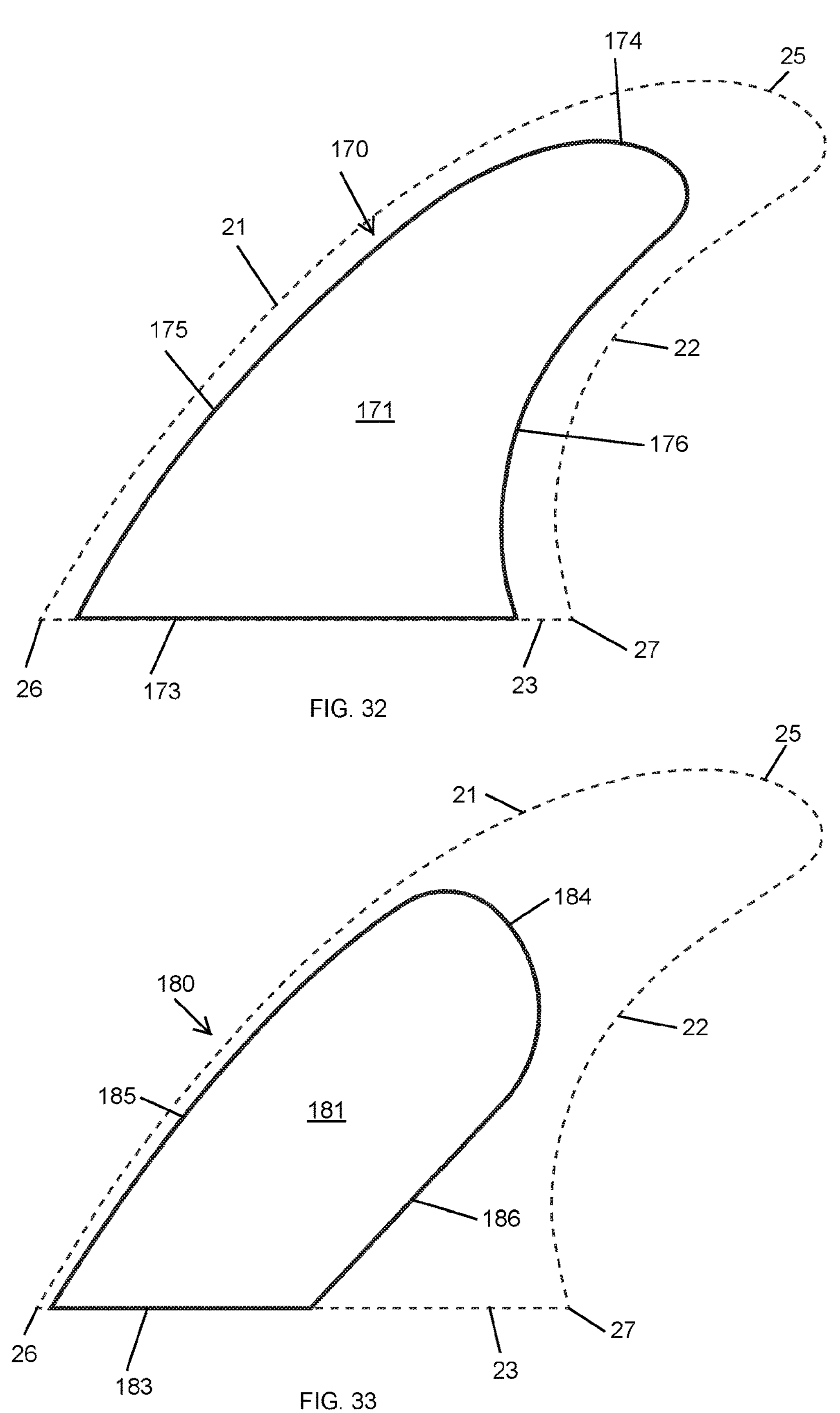

FIG. 32 shows the flexible spine 170 that mimics the geometric shape of the fin. The flexible spine 170 has a first end 173 located at the base 23 and extending from adjacent the leading corner 26 to adjacent the trailing corner 27. The flexible spine 170 has curved leading and trailing edges 175, 176 which substantially follow the curve of the leading and trailing edges 21, 22 of the fin. The leading edge 175 curves back toward the trailing edge 176, and the edges 175, 176 intersect at a rounded tip 174. The rounded tip 174 also follows the curve of the tip 25 of the fin but is spaced a distance from the fin tip 25. The flexible spine 170 has a flat top surface 171 and a flat bottom surface (not shown). Alternatively, the top and bottom surfaces of the flexible spine 170 may be flat but curve to mimic the shape of the foil of the fin.

FIG. 33 illustrates another embodiment showing the flexible spine 180. The flexible spine 180 has a first end 183 located at the base 23 and extending from adjacent the leading corner 26 to a position approximately halfway between the leading and trailing corners 26, 27. The flexible spine 180 has a curved leading edge 185 which substantially follows the curve of the leading edge 21 of the fin. The trailing edge 186 is a straight edge extending at an angle from the base 183 and is positioned to run approximately parallel to the leading edge 185. The leading edge 185 curves back toward the trailing edge 186, and the edges 185, 186 intersect at a rounded tip 184. The rounded tip 184 is spaced a distance from the fin tip 25. The flexible spine 170 has a flat top surface 181 and a flat bottom surface (not shown). Alternatively, the top and bottom surfaces of the flexible spine 180 may be flat but curve to mimic the shape of the foil of the fin.

Figures 34, 35:
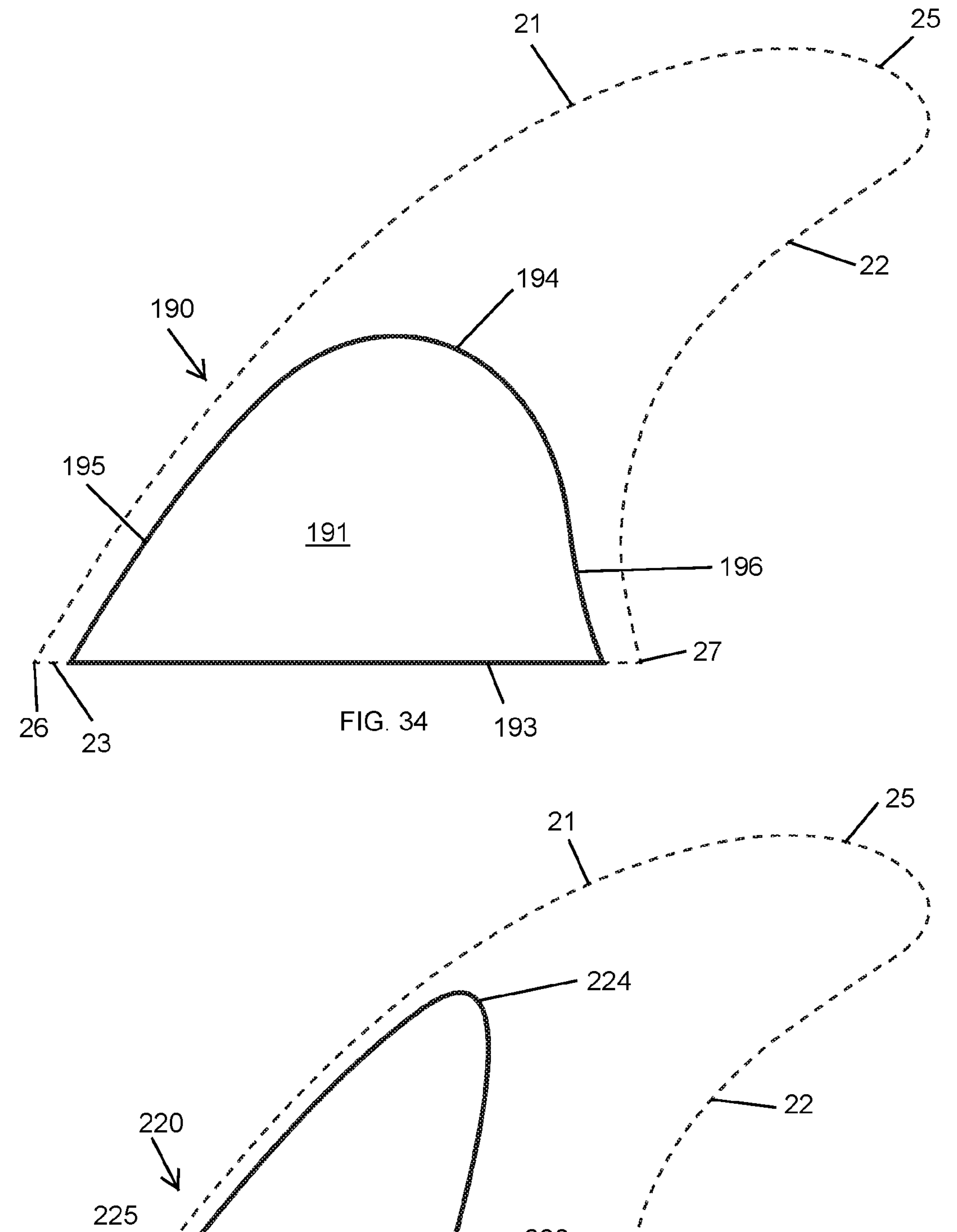

FIG. 34 shows the flexible spine 190 that has a first end 193 located at the base 23 and extending from adjacent the leading corner 26 to adjacent the trailing corner 27. The flexible spine 190 has curved leading and trailing edges 195, 196 with the leading edge 195 curving back toward the trailing edge 196 and the trailing edge 196 curving forward towards the leading edge 195, the edges 195, 196 intersect at a rounded tip 194. The flexible spine 190 has a flat top surface 171 and a flat bottom surface (not shown). Alternatively, the top and bottom surfaces of the flexible spine 190 may be flat but curve to mimic the shape of the foil of the fin.

FIG. 35 shows the flexible spine 200 that has a first end 203 located at the base 23 and extending from adjacent the leading corner 26 to a position approximately halfway between the leading and trailing corners 26, 27. The flexible spine 200 has curved leading and trailing edges 205, 206 with the leading edge 205 curving back toward the trailing edge 206 and the trailing edge 206 curving forward towards the leading edge 205, the edges 205, 206 intersect at a rounded tip 204. The flexible spine 200 has a flat top surface 201 and a flat bottom surface (not shown). Alternatively, the top and bottom surfaces of the flexible spine 200 may be flat but curve to mimic the shape of the foil of the fin.

Figure 36:
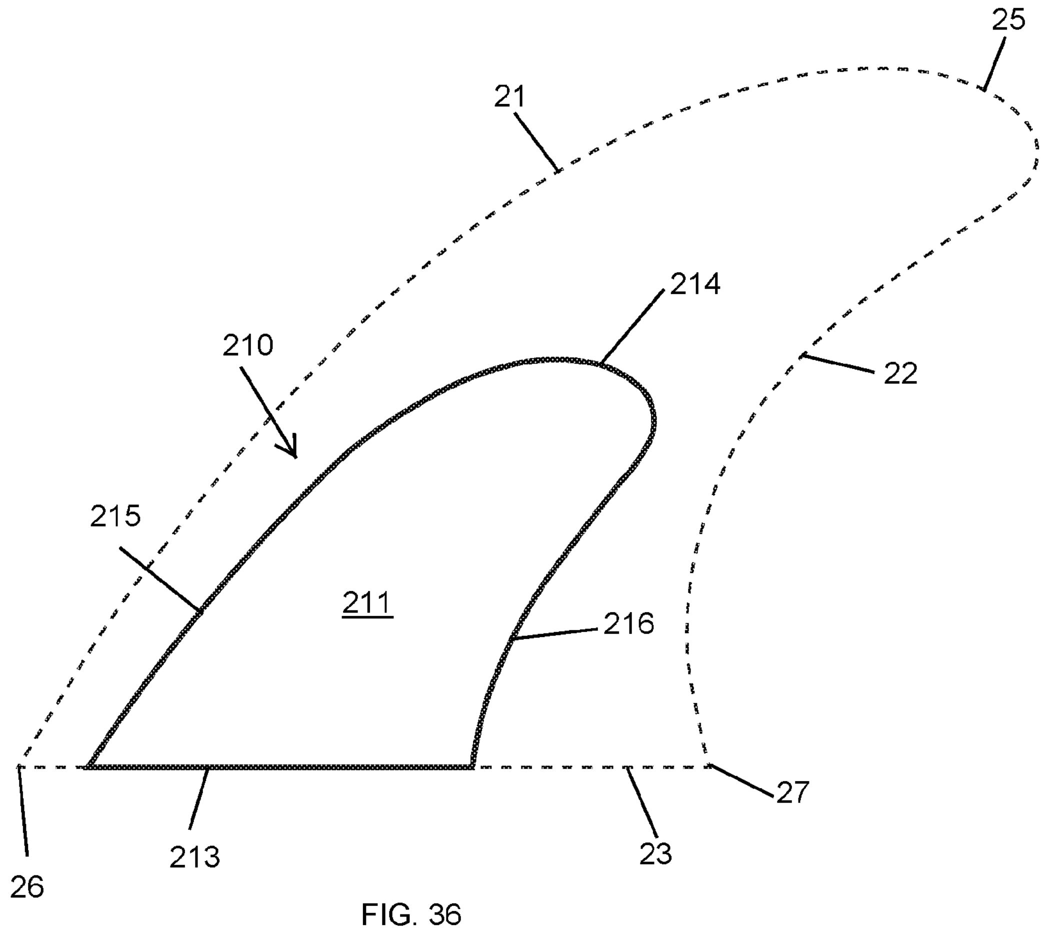

FIG. 36 shows the flexible spine 210 which is similar in shape to the flexible spine 170 however is smaller in size. The first end 213 located at the base 23 and extending spaced a distance from the leading corner 26 to a position spaced a distance from the trailing corner 27. The flexible spine 210 has curved leading and trailing edges 215, 216 which substantially follow the curve of the leading and trailing edges 21, 22 of the fin. The leading edge 215 curving back toward the trailing edge 216, and the edges 215, 216 intersect at a rounded tip 214. The rounded tip 214 also follows the curve of the tip 25 of the fin but is spaced a distance from the fin tip 25. The flexible spine 210 has a flat top surface 211 and a flat bottom surface (not shown). Alternatively, the top and bottom surfaces of the flexible spine 210 may be flat but curve to mimic the shape of the foil of the fin.

Figure 37:
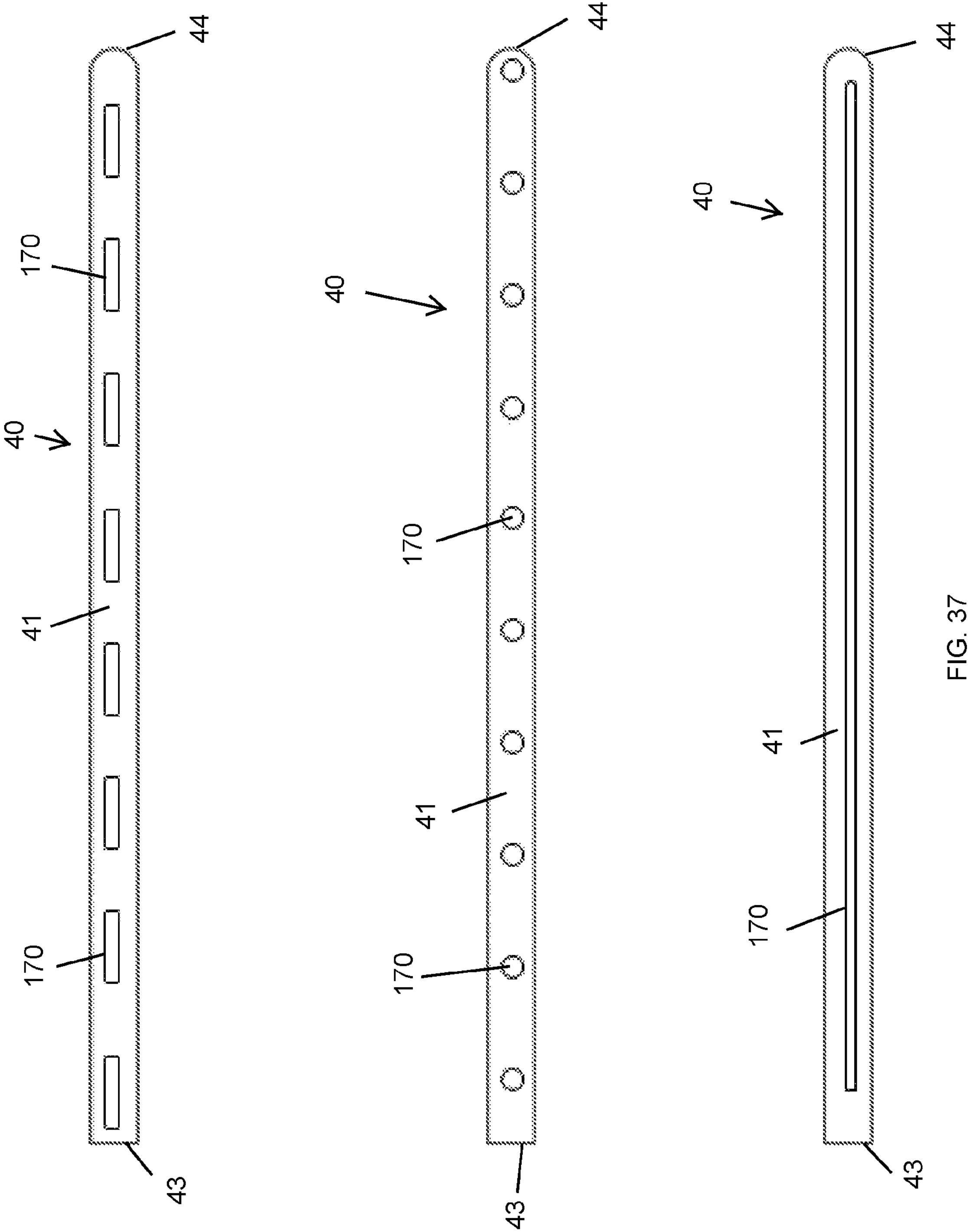
FIG. 37 illustrates a flexible spine showing different apertures or passages formed therein to assist with the chemical bonding of the spine to the fin.

In order to provide a better bond between the flexible spines and fins 10, passages 170 as shown in FIG. 37 extend entirely through the flexible spine 40, so that upon the flexible spine 40 being secured or fixed to the fin 10 by the chemical bonding material, the chemical bonding resin is able to pass through the passages 170 to further aid in securing the flexible spine 40 to the fin 10. The passages or apertures 170 are generally elongated, with the majority extending generally parallel to and along the midline axis passing longitudinally through the middle of the flexible spine 40. The elongated apertures 170 can also be located adjacent the outer periphery of the flexible spine 40. Alternatively, the apertures 170 may be more circular and located in groups extending along the flexible spine 40. In particular, the circular apertures 170 can be located on either end and in the middle of the flexible spine and extending a distance along the flexible spine. Like the passages 170 the circular apertures 170 extend entirely through the flexible spine 40. As a further alternative, the passage 170 may be a single aperture extending along the midline axis and positioned from the first end 43 to the second end 44. Also, while circular and slotted apertures 170 have been illustrated the present invention extends to apertures 170 of all shapes and sizes and positions within the flexible spine 40.

As a further alternative, the passages may extend across the width or perpendicular to the sides of the flexible spine. The passages can be located in groups situated at either end of the flexible spine or located substantially in the middle section of the flexible spine. Like all previous passages or apertures, they extend entirely through the elongate body of the flexible spine.

As illustrated in FIGS. 2 and 10 the flexible spine can be produced with a substantially rectangular cross section, however a variety of different cross-sectional shapes can also be provided for the flexible spine. For example, the flexible spine could have flat top and bottom sides joined by a radiused peripheral edge. This cross-sectional shape is similar to that of a rounded same side corner rectangle. While the flexible spine has been largely shown as having a rectangular cross-sectional shape other options are available, and any shape is not excluded from the present invention. Likewise, the respective ends of the flexible spines can be formed in any number of different shapes. For example, the ends could be rounded, squared, triangular or a particular shape dictated by the position of the end of the spine in relation to the location on the fin 10.

Figure 38:
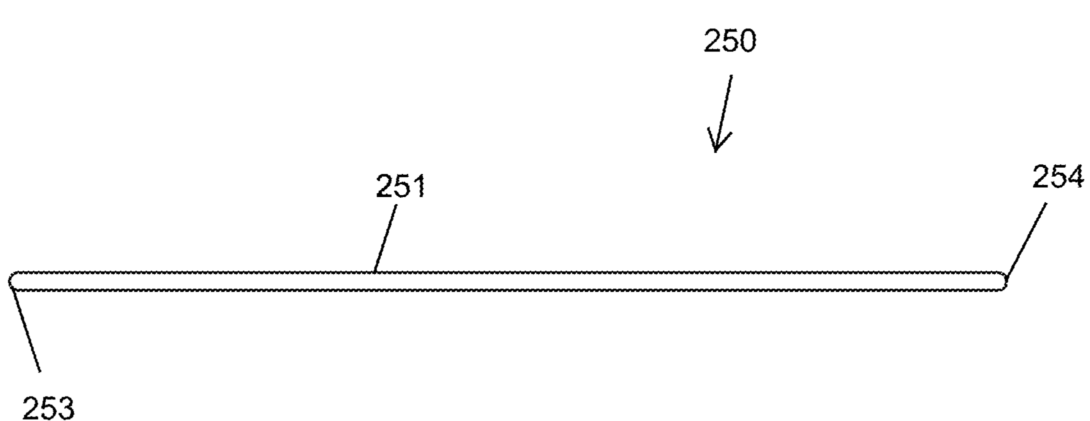
FIG. 38 shows views of a cylindrical shaped flexible spine in accordance with a further embodiment of the present invention.
Figure 38:
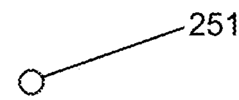
Figure 38:
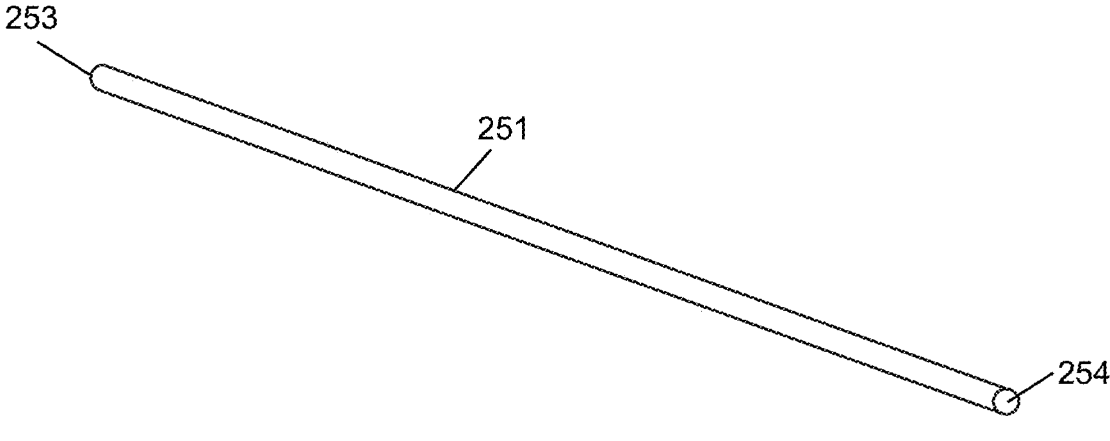

FIG. 38 illustrates a still further embodiment of the present invention in which the flexible spine 250 has an elongate cylindrical tube shape. Like all previous flexible spines, the flexible spine 250 is provided in different lengths, widths or in this case diameters and end profiles. The non-woven molded unidirectional fibre reinforced flexible spine 250 has an elongate body 251 which has a first end 253 spaced apart from a second end 254. The ends 253, 254 have a semicircular shape but can be provided in other shapes dependent upon the placement of the flexible spine 250 within the fin 10, as will be described further below.

FIGS. 39 to 58 illustrate the flexible spine(s) 250 positioned as illustrated. FIGS. 39 to 42 show a single flexible spine 250 in different positions on the fin 10. FIGS. 39 to 41 show the flexible spine 250 positioned adjacent and running substantially parallel with the leading edge 21 of the fin 10. The ends 253 are all substantially positioned adjacent to the base 23 and near the leading edge corner 26. The only difference between FIGS. 39 to 41 is the position of the second end 254. FIG. 42 the flexible spine 250 is positioned more in the centre of the fin 10 with the first end 253 positioned adjacent to the base 23 and the second end 254 adjacent to the fin tip 25.

Figures 43, 44, 45, 46, 47, 48:
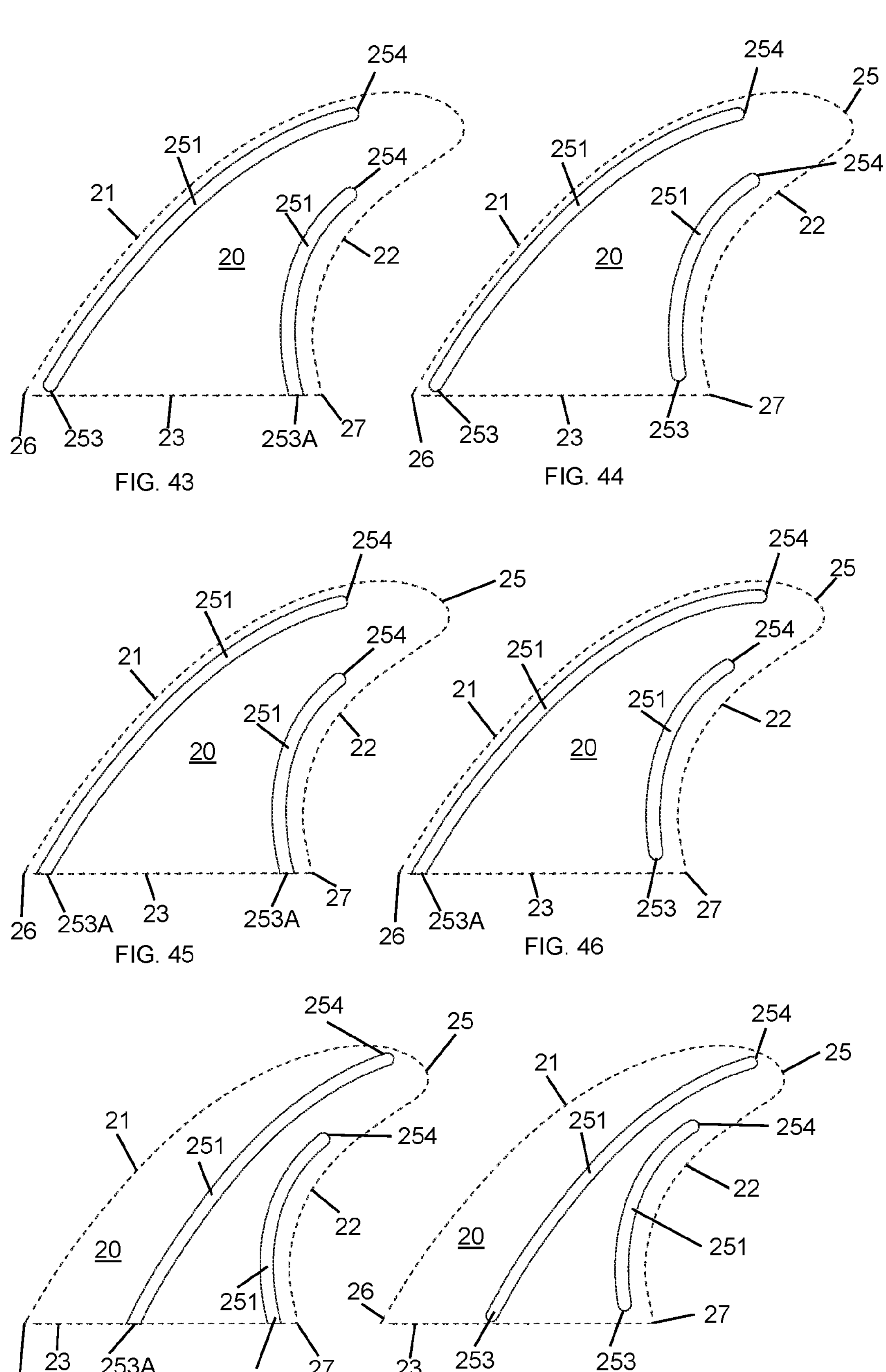

FIGS. 43 to 48 show two flexible spines 250 positioned between the first and second side walls 20, 28 (not shown) of the fin 10. FIGS. 43 to 46 all show a first flexible spine 250, with its first end 253, 253A extending from adjacent to the base 23 and near the leading edge corner 26 and running substantially parallel to and adjacent to the leading edge 21 of the fin 10. The only differences between the first flexible spines 250 are the end position of the second end 254 and the end profile of the first end 253A. In FIGS. 45 and 46 the first end 253A is positioned and shaped to correspond to the position on the base 23. The second flexible spine 250 is a shorter spine positioned adjacent to and running parallel to the trailing edge 22. The second flexible spine 250 is positioned to mimic the curve of the trailing edge 22. The second flexible spines 250 and the shape and position of the first and second ends 253, 254 of FIGS. 44 and 46 are identical. The second flexible spine 250 of FIGS. 43 and 45 differ from FIGS. 44 and 46 in that the first end 253A is positioned and shaped to correspond to the position on the base 23.

FIGS. 47 and 48 differ from FIGS. 43 to 46 in that the first flexible spine 250 is positioned more in the centre of the fin 10 with the first end 253, 253A positioned adjacent to the base 23 and the second end 254 adjacent to the fin tip 25.

Figures 49, 50, 51, 52, 53, 54:
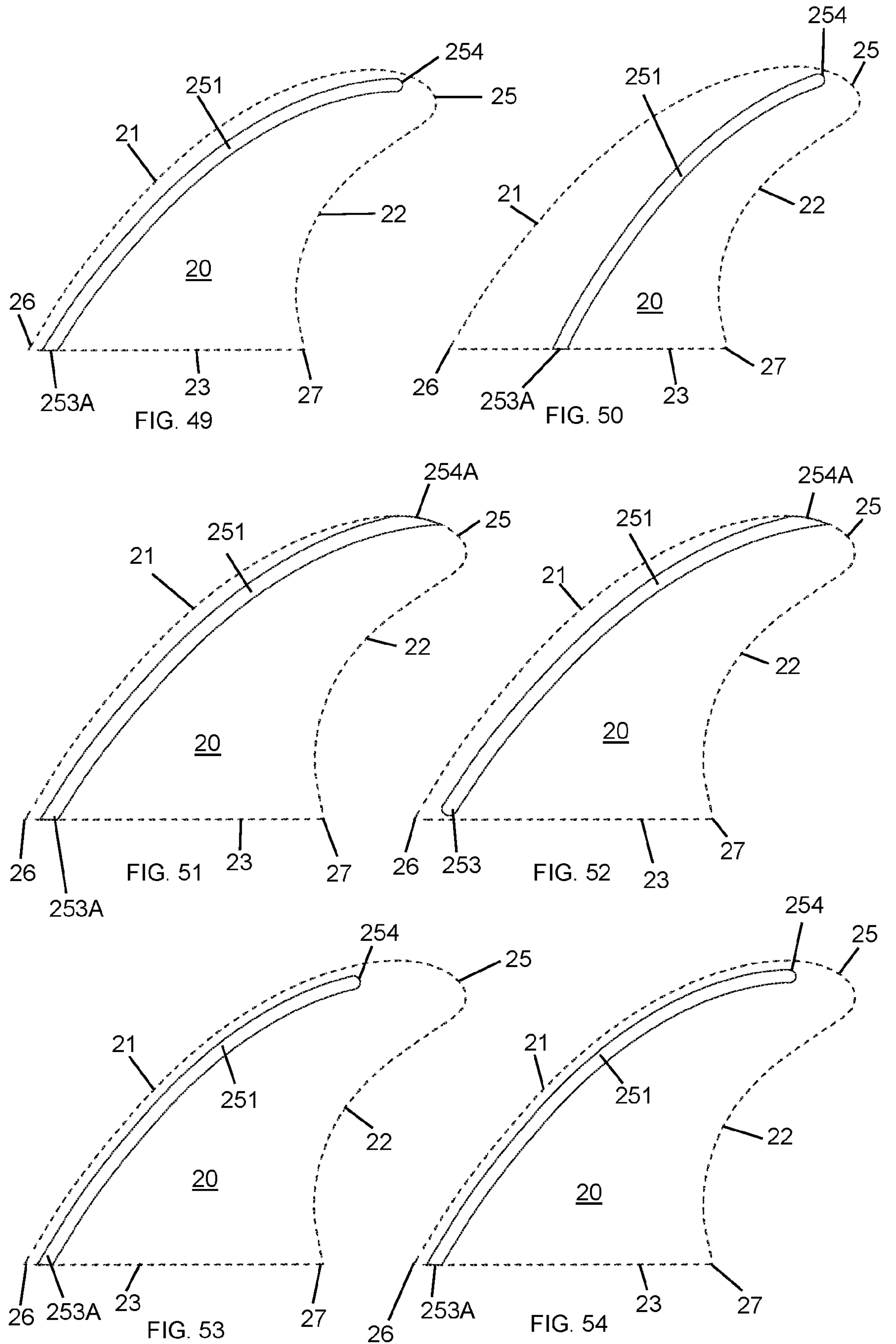

FIGS. 49 to 54 all illustrate a single flexible spine 250 positioned in the fin 10. With the exception of FIG. 50 all of the non-woven molded unidirectional fibre reinforced flexible spines 250 are positioned adjacent and running substantially parallel to the leading edge 21. In FIG. 50 the flexible spine 50 is positioned more in the centre of the fin 10 with the first end 253A positioned adjacent to the base 23 and the second end 254 adjacent to the fin tip 25. The only other differences are the shape or profile of the first ends 253, 253A and the second ends 254, 254A. The second ends 254A are shaped and positioned to correspond to their position at the junction of the leading edge 21 and the fin tip 25.

FIGS. 55 to 58 illustrate the positioning of two flexible spines 250 with the second one of the flexible spines 250 forming an angle with respect to the first flexible spine 250 and also passing over the top of the first flexible spine 250 within the fin 10. FIG. 55 shows the first flexible spine 250 with the first end 253B positioned at the leading edge corner 26 and the end 253B is shaped to correspond to the shape formed at the junction of the leading edge 21 and the base 23. The first flexible spine 250 extends from the leading edge corner 26 to the fin tip 25 where the second end 254A is positioned and shaped to suit the position in the fin tip 25. The second flexible spine 250 with the first end 253B positioned at the trailing edge corner 27 and the end 253B is shaped to correspond to the shape formed at the junction of the trailing edge 22 and the base 23. The second flexible spine 250 extends from the trailing edge corner 27 to a point on the leading edge 21 where the second end 254A is positioned and shaped to suit the position on the leading edge 21.

FIG. 56 differs from FIG. 55 in that the first flexible spine 250 is positioned adjacent to and running substantially parallel with the leading edge 21. The second flexible spine 250 is identical to that shown in FIG. 55. The first end 253A is positioned on the base 23 and in close proximity to the leading edge corner 26 and the end 253A is shaped to correspond to the shape formed at the base 23. The first flexible spine 250 extends from the base 23 to a point proximal to the junction between the fin tip 25 and the leading edge 21 where the second end 254 is positioned.

FIGS. 57 and 58 are substantially identical with the exception of the end profile of the first end 253, 253A of the first flexible spine 250. The first flexible spine 250 is positioned more in the centre of the fin 10 with the first end 253, 253A positioned adjacent to the base 23 and the second end 254 adjacent to the fin tip 25.

With all of the above embodiments of the flexible spine(s), the position of each spine in the fin 10 along with the composition of fibres and resin in the flexible spine will determine the flex characteristic for the fin 10. It is also understood that while a core 100 is not shown in all embodiments it could be included in any one or more of the embodiments illustrated.

By way of example only the flexible spine may be offered in any one or more of the following variations:

1. One or two is a soft flexible spine;
2. Three to five is a medium flexible spine;
3. Six to eight is a stiff flexible spine; and
4. Nine or ten is a very stiff flexible spine.

Based on the composition of materials in the flexible spine determines the flex pattern of the actual flexible spine. Therefore, whilst the flexible spine positioning will help determine flex control in the fin, the actual composition of the flexible spine plays an important role also. For example, two flexible spines in exactly the same position on the fin 10, but with different compositions, will give a different flex outcome. By way of example only, flexible fins are more forgiving and generally easier to surf. A progressive flex pattern is advantageous, featuring a stiffer base for drive and control and flex through to the fins tip that allow it to flex, load up on energy and spring out of turns. A stiffer fin is responsive and suit higher levels of surfing and heavier/stronger surfers. Stiffer fins provide a high level of energy that can be accessed and utilised for extra speed, drive, and control. A fin that feels too stiff will be challenging to generate speed and manoeuvre, whilst too much flex (like some plastic fins) will lack responsiveness and undermine a surfer's ability. A medium flex pattern is considered an all-rounder, whilst stiffer fins such as a full glass (hand foiled fin) are step up options for progressive surfing or waves featuring higher levels of speed and power.

The flexible spine may also incorporate an electrical conductor (not shown) or conductive material embedded within and extending for substantially the length of the flexible spine. Alternatively, the conductor may only be embedded within a pre-determined length of the flexible spine. The electrical conductor is bonded with the composition of fibres and resin forming the flexible spine. Effectively the conductor is encapsulated within and extending the length of the composition of fibres and resins forming the flexible spine. Therefore, the conductor forms part of the pultrusion process of manufacturing the flexible spine.

The conductive material allows the flow of an electrical current in one or more directions. For example, a metal wire is a common electrical conductor. A conductive material is any material which will allow electric charge to move through it as an electric current. Usually, the charge is carried by electrons, and the conductor is a metal. Metals make good conductors because the outer electrons of their atoms are loosely attached, and the electrons can drift through the metal when a voltage is applied. By way of example only the conductive material may be selected from the group consisting of a metal, electrolyte, superconductor, semiconductor, plasma, and any non-metallic conductor such as a graphite or polymer.

An exemplary use of the conductive material embedded within the flexible spine would be as an antenna to radiate an electromagnetic field. The conductive material may form an antenna electrode. Alternatively, the conductive material may be used to connect a power source or signal generator located on the tail pad kicker or on or near the tail of a surfboard to an antenna connected within the fin 10. This could be used to send a location signal of the board and rider or as a shark deterrent.

Given the varying requirements for different weight, style and ability of the user or surfer the flexible spine comes in a number of varied cross-sectional shapes, end profiles, passage or aperture shapes and configurations, lengths, widths and thickness or depths. This allows for the customising of the fin for a watercraft to suit the user or surfer's requirements.

While the flexible spine has been illustrated as extending for substantially the length of the fin 10, other embodiments can include where the flexible spine extend the complete length of the fin 10. Also, due to the variable length of the flexible spine shorter spines may be used and placed in and around the fin 10 to suit the particular requirements of the user.

The unidirectional pultrusion process is a continuous manufacturing process of composite materials. In this technology, parts are made by the matrix extrusion process and by pulling the unidirectional fibres. This process will allow the fibres to align well before polymerization of the matrix. A 100% unidirectional composition (with all endless fibres within the flexible spine aligned in a parallel manner) ensures maximum stability and rigidity in the longitudinal direction. Shearing and tensile strength in the transverse direction are reduced.

Advantages

The present invention relates generally to fins and methods for making them as may be applied to watercraft, and in particular, to a fin with a flexible spine for enhancing the overall flex characteristic of the fin.

The present invention has been designed to overcome the problems of the large, constantly varying, and reverse bending and twisting stresses in fins and the known limitations of the current types of fins. Fins can flex unduly and may snap or break and in other aspects do not provide the optimal performance demanded by skilled riders.

The present invention came about due to a long felt need in the marketplace to optimise flex and increase the physical strength and durability of fins by improving the tensile strength and compressive strength in a new and innovative manner. Primarily, the flexible spine was designed to improve fin performance through optimising flex. By controlling the flex pattern and damping of fins will ultimately affect (in a positive way) the way a surfboard turns and therefore surfs.

The present invention provides a number of distinct advantages over the prior art, and in particular:

1. Increased overall strength and durability of the fin. This is provided:
    - a. Through increased compression and tensile strength through distributing load and energy. For example, fins for large waves require more structural integrity;
    - b. Increased unidirectional and overall axial (multi-directional) strength;
    - c. Reduced structural fatigue and snapping/breaking, hence adding to the lifespan and value of the fin; and
    - d. The strengthening of a fin and making it less likely to fail will certainly improve certain safety elements related to surfing. For example, losing a fin can leave a surfer in a compromising position.
2. Controlled Flex Pattern. Shapers believe this is the future of surfing, governing how and when a board and fin flexes which therefore helps determine the feel of the board as important factors such as speed and manoeuvrability can be controlled. The flexible spine allows the surfboard shaper/designer to develop a controlled flex pattern to suit the particular and varied requirements for fins.

By way of example only the following effects of flex pattern in relation to how a surfboard flows through a wave and manoeuvres are noted below:

Lighter and beginner level surfers may prefer more flex in the fin which makes a surfboard easier to turn.

Heavier surfers may prefer a stiffer flex pattern in the fin to give them more drive and a flex pattern that responds effectively to their power.

Performance surfers may like more flex in certain waves for a dynamic and lively feel (acceleration and flex assist in performing and completing manoeuvres).

Those wanting more speed and power may prefer less flex.

Surfers in powerful and/or choppy rough conditions may prefer a stiffer flex pattern that ensures more directional control and stability.

Stiffer flex creates faster response times however is less forgiving (therefore experienced surfers may like a stiffer feel to increase reaction times in and less experienced surfers more flex for a for forgiving feel).

Big wave surfers may prefer minimal flex and extra weight so they can punch through the waves with speed, power and predictability. There is a high level of diversity in surfboard designs such as single fins, twin fins, quad fins, longboard fins and SUP fins.

Furthermore, boards are designed (commonly custom designed) for a particular surfer to surf in certain types of waves. The flexible spine will ultimately allow surfboard shapers/designers and surfers to select the most suitable flex pattern for the surfboard design and types of waves that will be surfed.

3. Dynamic Flex Pattern. The flexible spine will flex to absorb force, distributing and storing energy and then respond back to its natural position. This response (or rate of return) provides a whip effect, creating acceleration and generating drive. The flexible spine is designed to flex in unity with the surfer and the wave, for example holding speed whilst going straight (minimal flex) and flexing when maneuvering.
4. Light weight, high strength to weight ratio with excellent compression stability. The flexible spine can also be increased in weight for certain fins.
5. The flexible spine provides the fin with both elasticity and vibration dampening properties. The elasticity allows the fin to deform and return to its original shape. Without some form of elasticity, the fin would be too stiff and break easily and without any dampening the fin would not smoothly return to the equilibrium position or original shape. The flexible spine ensures that the fin returns to the equilibrium position fast and smoothly.

Designing a high performing fin of predictable performance is a difficult task. The fin interacts with water flows on the face of a wave close to breaking, making water flow along and around them very complex. Competitive surfboard riders demand high speed, quick turning, and manoeuvrability in their surfboards and fins which causes the surfboard and fins to be highly and unpredictably stressed. The present invention provides a watercraft fin with a flexible spine for enhancing the overall flex characteristic of the fin and enhanced performance characteristics to suit any end use.

The present invention provides a non-woven molded unidirectional fibre reinforced flexible spine for a fin that is configured to react to increasing water pressure or hydrodynamic pressure on an inner or outer radius surface of the fin during a directional change by flexing laterally and reducing disproportionate water pressure or hydrodynamic pressure on the fin(s) first and second surfaces and decreasing the development of a low pressure core and subsequent cavitation flow in the laminar flow boundary of the leading edge of the fin, thus improving dimensional stability and control of the watercraft to which the fin is attached.

The non-woven molded unidirectional fibre reinforced flexible spine creates a literal "spine" in the fin that gives it structure—it will affect the flex pattern on both the inner and outer surfaces by controlling flex. The non-woven molded unidirectional fibre reinforced flexible spine also mitigates friction.

In use, when the fin interacts with water flows on the face of a wave the increasing water pressure or hydrodynamic pressure on the surfaces of the fin 10 cause the fin to deform. The deformation creates a vibration frequency which is the rate at which the fin vibrates. The non-woven molded unidirectional fibre reinforced flexible spine reduces the vibration frequency and therefore somewhat mitigates the friction between the water pressure or hydrodynamic pressure on the surfaces of the fin which cause the fin to deform. The non-woven molded unidirectional fibre reinforced flexible spine thereby provides the user with a more balanced feel between control and manoeuvrability which benefits optimal acceleration and speed.

Elasticity is the ability of the fin body to return to its original shape when the forces of the water on the faces of the fin which cause the fin to deform are removed. The time it takes for the fin to return to its original shape is the recoil rate. The non-woven molded unidirectional fibre reinforced flexible spine provides the fin with both elasticity and dampening. The elasticity allows the fin to deform and return to its original shape. Without some form of elasticity, the fin would be too stiff and break easily and without any dampening the fin would not smoothly return to the equilibrium position or original shape. The non-woven molded unidirectional fibre reinforced flexible spine ensures that the fin returns to the equilibrium position fast and smoothly.

The elasticity and dampening of the flexible spine is due to the unidirectional pultrusion and the composition of fibres and resin which form the flexible spines 40 of different length, width, height, and cross-sectional shape. The non-woven molded unidirectional fibre reinforced flexible spine can be formed in any shape and with any end profile to suit the position within the fin and/or the size and shape of the fin.

Variations

It will be realized that the foregoing has been given by way of illustrative example only and that all other modifications and variations as would be apparent to persons skilled in the art are deemed to fall within the broad scope and ambit of the invention as herein defined in the appended claims.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A fin for a watercraft comprising:

a substantially planar member having a first side surface, a leading edge, a second side surface opposite the first side surface, a trailing edge opposite the leading edge, and a base providing an area for attachment to a watercraft surface by either mechanical means or permanent bonding, wherein the leading edge and the trailing edge intersect at a fin tip;

at least one flexible spine having an elongate body with a length, a top side, a bottom side, a first end spaced apart from a second end and peripheral edges joining the top and bottom sides such that a spine width associated with at least the top side is greater than a spine thickness associated with the peripheral edges, each flexible spine is molded from a composition of a plurality of unidirectional fibres and resin using a continuous pultrusion molding process; and wherein the at least one flexible spine is bonded to be fixed between the first and second side surfaces of the fin;

wherein the plurality of unidirectional fibres form an elastically deformable spine; and wherein the composition of fibres and resin, number, placement and size of the at least one flexible spine between the first and second side surfaces of the fin, provides the fin with a customised dynamic flex pattern, strength properties, a controlled rate at which the fin vibrates and a dampening effect which reduces a recoil rate of the fin when an applied force is removed from the fin and allows the fin to return to an original shape.

2. A fin as claimed in claim 1, wherein the fin further comprises a leading corner formed at the junction of the leading edge and a first end of the base and a trailing corner formed at the junction of the trailing edge and a second end of the base, and a centre line axis extends from the leading corner to the fin tip.

3. A fin as claimed in claim 1, wherein the fibres of the at least one flexible spine composition are unidirectional in relation to the length of the flexible spine, wherein the fibres are selected from the group consisting of: glass fibres, cellulose fibres, carbon fibre composites, basalt fibres, synthetic fibres or any combination thereof, wherein the glass fibres are E-glass or S-glass fibres, and wherein the synthetic fibres are aramid fibres or polyolefin fibres, and wherein the resin of the at least one flexible spine composition is selected from the group consisting of: vinyl ester resins, epoxy resins, and polyester resins.

4. A fin as claimed in claim 3, wherein the composition of fibres and resin in the at least one flexible spine has been designed to have a chemical structure that bonds with a plurality of materials and a plurality of resins to ensure a unified fin structure, the structure providing the fin with the customised dynamic flex pattern and strength properties to provide enhanced performance characteristic to suit an end user.

5. A fin as claimed in claim 1, wherein in use, when an increased vibrational friction is experienced by the fin the at least one flexible spine provides the fin with improved damping properties by controlling the vibration frequency of the fin and thereby providing the user with a balance between control and maneuverability and the benefit of optimal acceleration and speed.

6. A fin as claimed in claim 1, wherein the at least one flexible spine is an elongate member formed in different lengths, widths, depths, cross-sectional shapes and end profiles to be accommodated in different positions within different sized and shaped fins.

7. A fin as claimed in claim 1, wherein the at least one flexible spine comprises a uniform cross-section throughout the length of the at least one flexible spine.

8. A fin as claimed in claim 1, wherein the at least one flexible spine comprises a non-uniform cross-section throughout the length of the at least one flexible spine.

9. A fin as claimed in claim 1, wherein the at least one flexible spine comprises a cross-section which tapers from the first end to the second end of the at least one flexible spine, wherein the cross-section tapers in thickness axially along the length of the at least one flexible spine from the first end to the second end.

10. A fin as claimed in claim 1, wherein the at least one flexible spine has a section of uniform cross-sectional shape extending from the first end for a substantial length of the at least one flexible spine and a tapered section extending from the section of uniform cross-sectional shape to the second end, wherein the section of uniform cross-sectional shape comprises approximately two thirds of the length of the at least one flexible spine and the tapered section comprises approximately one third of the length of the at least one flexible spine.

11. A fin as claimed in claim 1, wherein the fin further comprises a core located within the planar member and positioned between the first and second side surfaces.

12. A fin as claimed in claim 11, wherein the core has a first portion extending from the base of the fin and a peripheral edge portion running parallel with and spaced apart a distance from the leading and trailing edges of the fin, the first portion extending along substantially the length of the base, and the core is at least one of a solid material and a foam material, the solid material core is selected from any one of a resin impregnated fibre glass, a hardened resin, a plastics material, bamboo or wood, the foam material core is selected from any one of a polyvinyl chloride (PVC) foam material or a polyurethane (PU) foam material.

13. A fin as claimed in claim 11, wherein the core is formed from a plurality of hexagonal prisms forming a honeycomb/hexagonal shaped design, and the at least one flexible spine is positioned on a side of the core and between the core and either the first or second side surfaces.

14. A fin as claimed in claim 1, wherein the fin is manufactured from a fibreglass material or a fibreglass composite material using a resin transfer moulding (RTM) process or is machined from a fibreglass panel, wherein when the fin is manufactured using the RTM process the at least one flexible spine is placed in a fin mold and layers of fibreglass are placed around the at least one flexible spine prior to a resin being injected into the mold, and wherein when the fin is machined from the fibreglass panel the process comprises cutting the fin from the fibreglass panel using an automated computer numerical control (CNC) cutting machine, the fin further comprises at least one slotted aperture formed in any one or more of the first and second surfaces, the slotted aperture extends into the enclosed space of the fin and extends from adjacent the leading corner to adjacent the fin tip, and the at least one flexible spine is bonded to be fixed within the at least one slotted aperture and between the first and second side surfaces of the fin.

15. A fin as claimed in claim 14, wherein when the fin has been manufactured using the resin transfer moulding (RTM) process or is machined from the fibreglass panel, the at least one flexible spine remains flexible within the fin to provide the customised dynamic flex pattern and strength properties for the fin.

16. A fin as claimed in claim 1, wherein the at least one flexible spine is configured to react to increasing water pressure or hydrodynamic pressure on an inner or outer radius surface of the fin during a directional change by flexing laterally and producing the dampening effect and reducing a vibration frequency of the fin, the dampening effect reducing disproportionate water pressure or hydrodynamic pressure on the first and second side surfaces and decreasing the development of a pressure core and subsequent cavitation flow in a laminar flow boundary of the leading edge of the fin, thus improving dimensional stability and control of the watercraft to which the fin is attached.

17. A fin as claimed in claim 2, wherein the substantially planar member is a vertical rigid convex foil with the leading edge curving from the leading corner of the fin base to the fin tip, the first and second side surfaces extending from the leading edge and terminating at the trailing edge curving from the fin tip to the trailing corner of the fin base, wherein both the leading and trailing edges intersect at the fin tip.

18. A fin as claimed in claim 1, wherein the at least one flexible spine is an elongate cylindrical tube.

* * * * *